US012672061B2

(12) United States Patent
Kim et al.

(10) Patent No.: US 12,672,061 B2
(45) Date of Patent: Jun. 30, 2026

(54) ELECTRONIC DEVICE TRANSMITTING UE ASSISTANCE INFORMATION MESSAGE AND METHOD FOR OPERATING THEREOF

(71) Applicant: Samsung Electronics Co., Ltd., Suwon-si (KR)

(72) Inventors: Hyejeong Kim, Suwon-si (KR); Hong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 18/495,217

(22) Filed: Oct. 26, 2023

(65) Prior Publication Data

US 2024/0147360 A1     May 2, 2024

Related U.S. Application Data

(63) Continuation of application No. PCT/KR2023/016661, filed on Oct. 25, 2023.

(30) Foreign Application Priority Data

Oct. 26, 2022     (KR) ........................ 10-2022-0139357
Nov. 15, 2022     (KR) ........................ 10-2022-0153074

(51) Int. Cl.
*H04W 52/02*          (2009.01)
(52) U.S. Cl.
CPC ............................... *H04W 52/0209* (2013.01)
(58) Field of Classification Search
None
See application file for complete search history.

(56) References Cited

U.S. PATENT DOCUMENTS

| | | | | |
|---|---|---|---|---|
| 6,003,086 | A | * 12/1999 | Mitsutake | ............... H04L 67/62 |
| | | | | 709/227 |
| 2005/0201291 | A1* | 9/2005 | Gluck | ................... G06F 1/3278 |
| | | | | 370/241 |
| 2006/0141991 | A1 | 6/2006 | House et al. | |
| 2020/0186991 | A1 | 6/2020 | He et al. | |
| 2021/0051585 | A1 | 2/2021 | Kim et al. | |

(Continued)

FOREIGN PATENT DOCUMENTS

| | | |
|---|---|---|
| CN | 114007256 A | 2/2022 |
| CN | 115022944 A | 9/2022 |

(Continued)

OTHER PUBLICATIONS

Intel Corporation; Assistance information from UE; 3GPP TSG-RAN WG2 Meeting #119bis Electronic; R2-2209736; Sep. 30, 2022, Elbonia.

(Continued)

*Primary Examiner* — The Hy Nguyen
(74) *Attorney, Agent, or Firm* — Jefferson IP Law, LLP

(57) ABSTRACT

An electronic device is provided. The electronic device includes at least one processor. The at least one processor may be configured to detect execution of at least one first application, identify at least one first information element (IE) of a user equipment (UE) assistance information (UAI) message stored corresponding to the at least one first application and/or information related to the location of the electronic device, and transmit a UAI message including the at least one first IE to a network.

18 Claims, 13 Drawing Sheets

(56) References Cited

U.S. PATENT DOCUMENTS

| | | | |
|---|---|---|---|
| 2021/0136006 A1 | 5/2021 | Casey et al. | |
| 2021/0204261 A1 | 7/2021 | Sharma et al. | |
| 2021/0266997 A1 | 8/2021 | He | |
| 2022/0039047 A1* | 2/2022 | Tsai | H04W 8/24 |
| 2022/0132439 A1 | 4/2022 | Lee et al. | |
| 2022/0286961 A1 | 9/2022 | Chang et al. | |
| 2022/0417730 A1* | 12/2022 | Tsai | H04W 8/22 |
| 2023/0180121 A1* | 6/2023 | Sheik | H04W 76/15 |
| | | | 370/329 |

FOREIGN PATENT DOCUMENTS

| | | | |
|---|---|---|---|
| JP | 2022-029618 A | 2/2022 |
| KR | 10-2021-0020474 A | 2/2021 |
| KR | 10-2021-0034477 A | 3/2021 |
| KR | 10-2022-0053359 A | 4/2022 |
| WO | 2021/159327 A1 | 8/2021 |

OTHER PUBLICATIONS

International Search Report dated Jan. 25, 2024, issued in International Patent Application No. PCT/KR2023/016661.

* cited by examiner

ELECTRONIC DEVICE TRANSMITTING UE ASSISTANCE INFORMATION MESSAGE AND METHOD FOR OPERATING THEREOF

CROSS-REFERENCE TO RELATED APPLICATION(S)

This application is a continuation application, claiming priority under § 365(c), of an International application No. PCT/KR2023/016661, filed on Oct. 25, 2023, which is based on and claims the benefit of a Korean patent application number 10-2022-0139357, filed on Oct. 26, 2022, in the Korean Intellectual Property Office, and of a Korean patent application number 10-2022-0153074, filed on Nov. 15, 2022, in the Korean Intellectual Property Office, the disclosure of each of which is incorporated by reference herein in its entirety.

TECHNICAL FIELD

The disclosure relates to an electronic device that transmits a user equipment (UE) assistance information (UAI) message and an operation method thereof.

BACKGROUND ART

The $3^{rd}$ generation partnership project (3GPP) has defined a UAI message in release 16. The UAI message may be a radio resource control (RRC) message for a user equipment to inform a network of various types of internal status. The network may receive the UAI message from the user equipment, and allocate and/or control appropriate resources at a specific time point of the user equipment based on the received UAI message.

For example, the UAI message may be used in an overheating situation, used to indicate preference for discontinuous reception (DRX) parameters for power saving, used to indicate the maximum aggregated bandwidth for power saving, used to indicate the maximum number of secondary component carriers (CCs) for power saving, or used to indicate the maximum number of multiple input multiple output (MIMO) layers for power saving.

As described above, the user equipment may use the UAI message for the purpose of saving power or mitigating an overheating status. For example, when a low power status or an overheating status is identified, the user equipment may adjust an information element (IE) in the UAI message and report the same to the network. For example, when a low power status or an overheating status is identified, the equipment may reduce the maximum aggregated bandwidth, reduce the maximum number of secondary component carriers (CCs), and/or reduce the maximum number of MIMO layers.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Aspects of the disclosure are to address at least the above-mentioned problems and/or disadvantages and to provide at least the advantages described below. Accordingly, an aspect of the disclosure is to provide an electronic device that transmits a user equipment (UE) assistance information (UAI) message and an operation method thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one processor. The at least one processor is configured to identify an execution of at least one first application, identify at least one first information element (IE) of a UAI message stored corresponding to the at least one first application and/or information related to the location of the electronic device, and transmit a UAI message including the at least one first IE to a network.

In accordance with another aspect of the disclosure, a method of operating an electronic device is provided. The method includes identifying an execution of at least one first application, identifying at least one first IE of a UAI message stored corresponding to the at least one first application and/or information related to the location of the electronic device, and transmitting a UAI message including the at least one first IE to a network.

According to an embodiment of the disclosure, one or more non-transitory computer-readable storage media storing computer-executable instructions, that when executed by at least one processor of an electronic device, configure the electronic device to perform operations including identifying an execution of at least one first application, identifying at least one first IE of a UAI message stored corresponding to the at least one first application and/or information related to the location of the electronic device, and transmitting a UAI message including the at least one first IE to a network.

Advantageous Effects

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
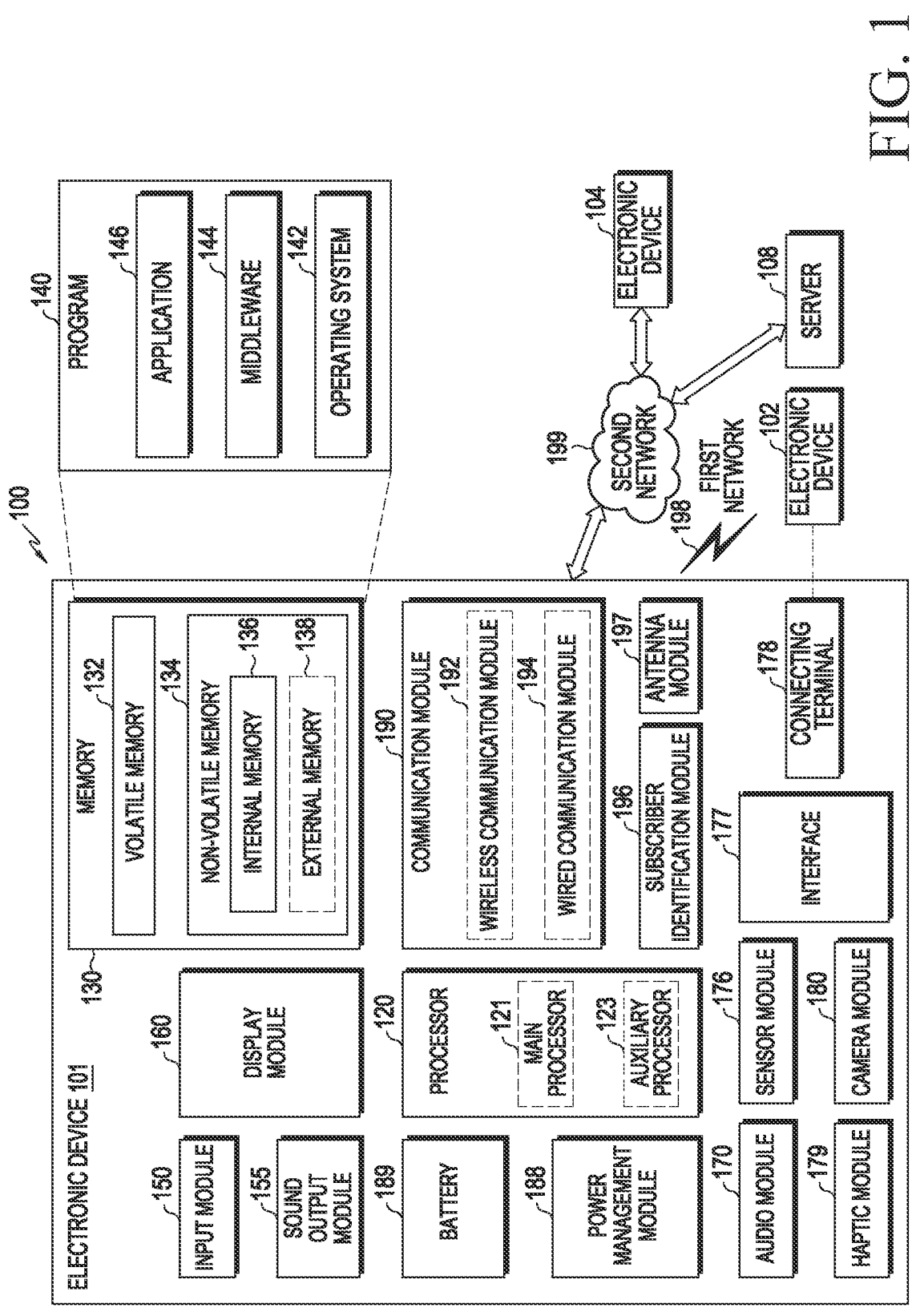
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
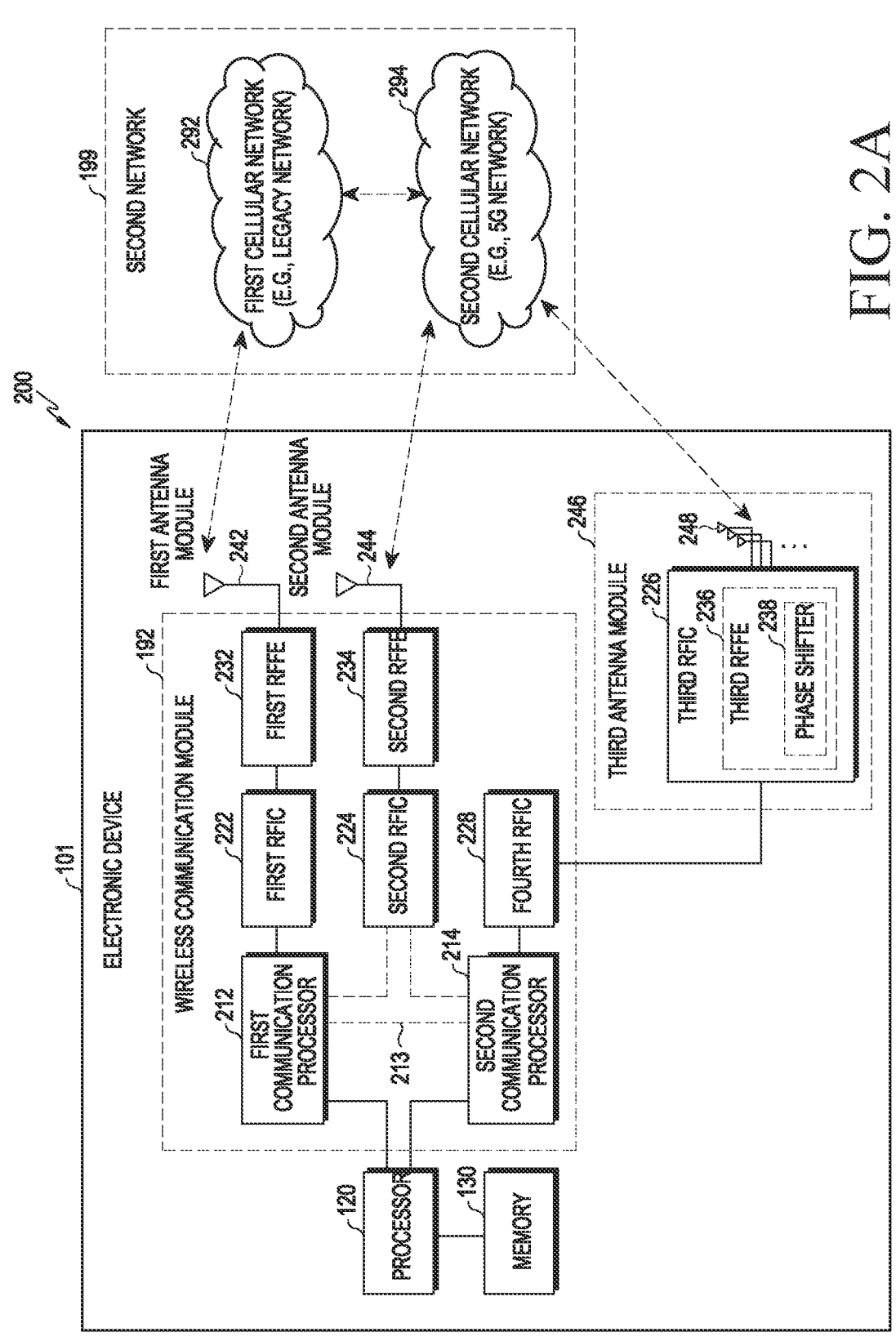
FIG. 2A is a block diagram of an electronic device for supporting legacy network communication and fifth generation (5G) network communication according to an embodiment of the disclosure.

FIG. 2A is a block diagram 200 of an electronic device for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246 and antennas 248. The electronic device 101 may further include a processor 120 and a memory 130. A second network 199 may include a first cellular network 292 and a second cellular network 294. According to another embodiment of the disclosure, the electronic device 101 may further include at least one component among the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may configure at least a part of the wireless communication module 192. According to another embodiment of the disclosure, the fourth RFIC 228 may be omitted or may be included as a part of the third RFIC 226.

The first communication processor 212 may support establishment of a communication channel of a band to be used for wireless communication with the first cellular network 292, and legacy network communication through the established communication channel. According to an embodiment of the disclosure, the first cellular network may be a legacy network including a second generation (2G), third generation (3G), fourth generation (4G), or long-term evolution (LTE) network. The second communication processor 214 may support establishment of a communication channel corresponding to a specified band (e.g., about 6 gigahertz (GHz) to about 60 GHz) among bands to be used for wireless communication with the second cellular network 294, and 5G network communication through an established communication channel. According to an embodiment of the disclosure, the second cellular network 294 may be a fifth generation (5G) network defined by the 3 rd generation partnership project (3GPP). Additionally, according to an embodiment of the disclosure, the first communication processor 212 or the second communication processor 214 may support establishment of a communication channel corresponding to another specified band (e.g., about 6 GHz or less) among bands to be used for wireless communication with the second cellular network 294, and 5G network communication through an established communication channel.

The first communication processor 212 may transmit and receive data to and from the second communication processor 214. For example, data that has been classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an inter-processor interface 213. The inter-processor interface 213 may be implemented as, for example, a universal asynchronous receiver/transmitter (UART), (e.g., high speed-UART (HS-UART) or a peripheral component interconnect bus express (PCIe) interface), but there is no limitation in the type thereof. Alternatively, the first communication processor 212 and the second communication processor 214 may exchange control information and packet data information using, for example, a shared memory. The first communication processor 212 may transmit and receive various information to and from the second communication processor 214, such as detection information, information on output strength, and resource block (RB) allocation information.

Depending on the implementation, the first communication processor 212 may not be directly connected to the second communication processor 214. In this case, the first communication processor 212 may transmit and receive data to and from the second communication processor 214 through the processor 120 (e.g., an application processor). For example, the first communication processor 212 and the second communication processor 214 may transmit and receive data to and from the processor 120 (e.g., an application processor) through the HS-UART interface or the PCIe interface, but the type of interface is not limited. Alternatively, the first communication processor 212 and the second communication processor 214 may exchange control information and packet data information using a shared memory with the processor 120 (e.g., an application processor).

According to an embodiment of the disclosure, the first communication processor 212 and the second communication processor 214 may be implemented in a single chip or a single package. According to embodiments of the disclosure, the first communication processor 212 or the second communication processor 214 may be configured in a single chip or a single package with the processor 120, an auxiliary processor 123, or a communication module 190.

Figure 2B:
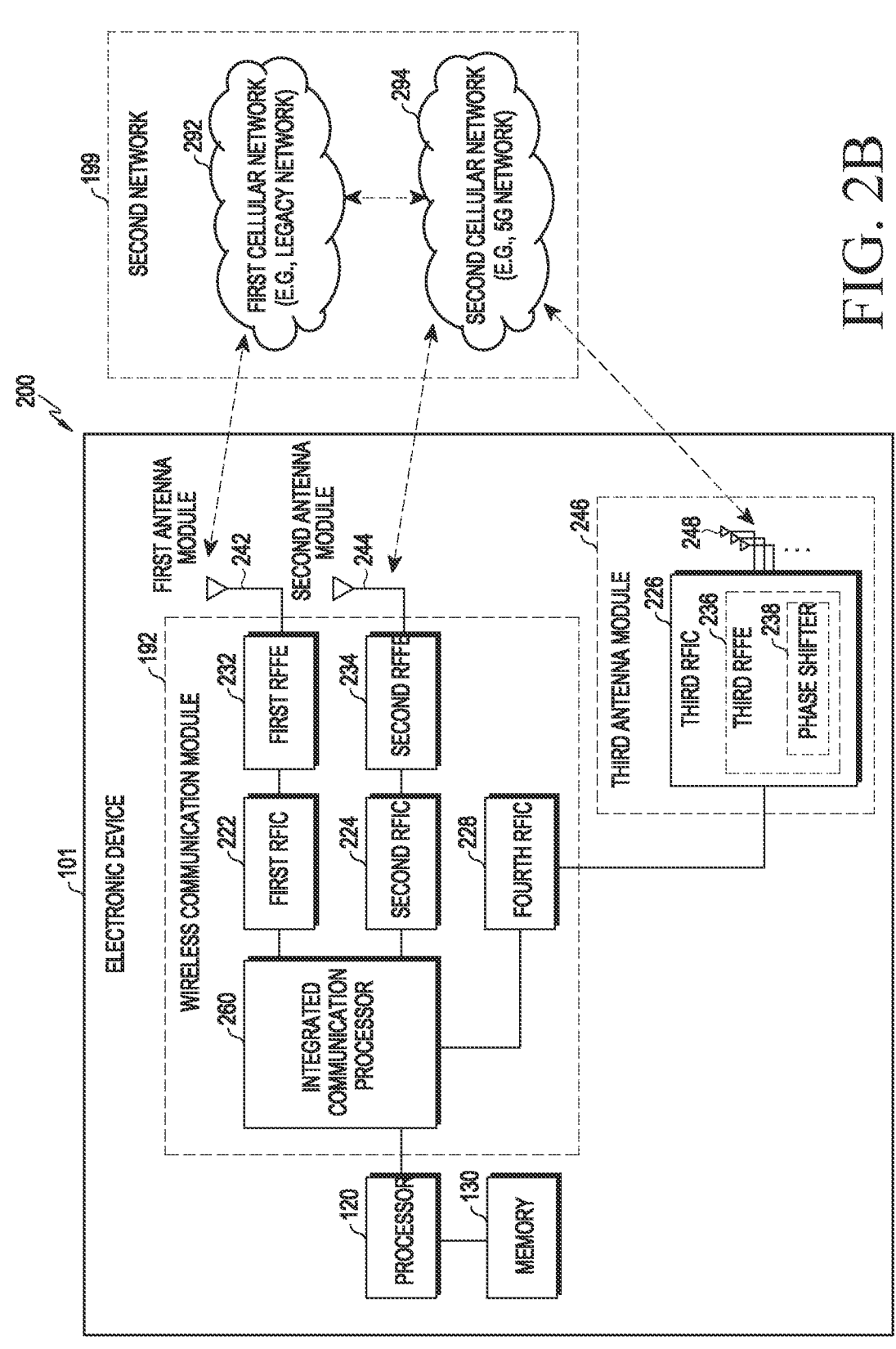
FIG. 2B is a block diagram of an electronic device for supporting legacy network communication and 5G network communication according to an embodiment of the disclosure.

FIG. 2B is a block diagram of an electronic device for supporting legacy network communication and 5G network communication according to an embodiment of the disclosure.

Referring to FIG. 2B, an integrated communication processor 260 may support both functions for communication with the first cellular network 292 and the second cellular network 294.

As described above, at least one of the processor 120, the first communication processor 212, the second communication processor 214, or the integrated communication processor 260 may be implemented as a single chip or a single package. In this case, the single chip or the single package may include a memory (or storage means) for storing an instruction that causes the execution of at least some of the operations performed according to embodiments of the disclosure, and a processing circuit (or there is no restriction on its name, such as arithmetic circuit) for executing the instruction.

The first RFIC 222, on transmission, may convert the baseband signal generated by the first communication processor 212 into a radio frequency (RF) signal of about 700 megahertz (MHz) to about 3 GHz used in the first cellular network 292 (e.g., a legacy network). On reception, an RF signal may be obtained from the first network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal to be processed by the first communication processor 212.

The second RFIC 224 may, on transmission, convert the baseband signal generated by the first communication processor 212 or the second communication processor 214 into an RF signal (hereinafter, 5G Sub6 RF signal) of the Sub6 band (e.g., about 6 GHz or less) used for the second cellular network 294 (e.g., a 5G network). On reception, a 5G Sub6 RF signal may be obtained from the second cellular network 294 (e.g., 5G network) through an antenna (e.g., second antenna module 244), and may be preprocessed through an RFFE (e.g., the second RFFE 234). The second RFIC 224 may convert the preprocessed 5G Sub6 RF signal into a baseband signal to be processed by a corresponding one of the first communication processor 212 or the second communication processor 214.

The third RFIC 226 may convert the baseband signal generated by the second communication processor 214 into an RF signal (hereinafter, 5G Above6 RF signal) of the 5G Above6 band (e.g., about 6 GHz to about 60 GHz) to be used in the second cellular network 294 (e.g., a 5G network). On reception, a 5G Above6 RF signal may be obtained from the second cellular network 294 (e.g., 5G network) through antennas (e.g., antennas 248), and may be preprocessed through a third RFFE 236. The third RFIC 226 may convert the preprocessed 5G Above6 RF signal into a baseband signal to be processed by the second communication processor 214. According to an embodiment of the disclosure, the third RFFE 236 may be configured as a part of the third RFIC 226.

According to an embodiment of the disclosure, the electronic device 101 may include the fourth RFIC 228 separately from or as at least a part of the third RFIC 226. In this case, the fourth RFIC 228 may convert the baseband signal generated by the second communication processor 214 into an RF signal (hereinafter, referred to as an IF signal) of an intermediate frequency band (e.g., about 9 GHz to about 11 GHz), and then transmit the IF signal to the third RFIC 226. The third RFIC 226 may convert the IF signal into a 5G Above6 RF signal. On reception, the 5G Above6 RF signal may be received from the second cellular network 294 (e.g., 5G network) through antennas (e.g., antennas 248) and converted to an IF signal by the third RFIC 226. The fourth RFIC 228 may convert the IF signal into a baseband signal to be processed by the second communication processor 214.

According to an embodiment of the disclosure, the first RFIC 222 and the second RFIC 224 may be implemented as at least a part of a single chip or a single package. According to an embodiment of the disclosure, when the first RFIC 222 and the second RFIC 224 in FIG. 2A or 2B are implemented as a single chip or a single package, they may be implemented as an integrated RFIC. In this case, the integrated RFIC may be connected to the first RFFE 232 and second RFFE 234 to convert a baseband signal into a signal of a band supported by the first RFFE 232 and/or second RFFE 234, and transmit the converted signal to one of the first RFFE 232 and the second RFFE 234. According to an embodiment of the disclosure, the first RFFE 232 and the second RFFE 234 may be implemented as at least a part of a single chip or a single package. According to an embodiment of the disclosure, at least one antenna module of the first antenna module 242 or the second antenna module 244 may be omitted or may be combined with another antenna module to process RF signals of a plurality of corresponding bands.

According to an embodiment of the disclosure, the third RFIC 226 and the antennas 248 may be disposed on the same substrate to configure the third antenna module 246. For example, the wireless communication module 192 or the processor 120 may be disposed on the first substrate (e.g., main PCB). In this case, the third RFIC 226 may be disposed in a partial area (e.g., bottom) of the second substrate (e.g., sub PCB) separate from the first substrate, and the antennas 248 may be disposed in another partial area (e.g., top), thereby configuring the third antenna module 246. By disposing the third RFIC 226 and the antennas 248 on the same substrate, it is possible to reduce the length of the transmission line therebetween. This, for example, may reduce loss (e.g., attenuation) of a signal in a high-frequency band (e.g., about 6 GHz to about 60 GHz) used for 5G network communication by the transmission line. Accordingly, the electronic device 101 may improve the quality or speed of communication with the second network 294 (e.g., a 5G network).

According to an embodiment of the disclosure, the antennas 248 may be configured as an antenna array including a plurality of antenna elements that may be used for beamforming. In this case, the third RFIC 226 may include, for example, as part of the third RFFE 236, a plurality of phase shifters 238 corresponding to a plurality of antenna elements. On transmission, each of the plurality of phase shifters 238 may convert the phase of a 5G Above6 RF signal to be transmitted to the outside (e.g., a base station of a 5G network) of the electronic device 101 through a corresponding antenna element. On reception, each of the plurality of phase shifters 238 may convert the phase of the 5G Above6 RF signal received from the outside through a corresponding antenna element into the same or substantially the same phase. This enables transmission or reception through beamforming between the electronic device 101 and the outside.

The second cellular network 294 (e.g., 5G networks) may operate independently (e.g., stand alone (SA)) of the first cellular network 292 (e.g., legacy networks) or may be connected and operated (e.g., non-stand alone (NSA)). For example, a 5G network may have only an access network (e.g., a 5G radio access network (RAN) or a next generation RAN (NG RAN)), and may not have a core network (e.g., a next generation core (NGC)). In this case, after accessing the access network of the 5G network, the electronic device 101 may access an external network (e.g., the Internet) under the control of a core network (e.g., evolved packed core (EPC)) of the legacy network. Protocol information (e.g., LTE protocol information) for communication with a legacy network or protocol information (e.g., new radio (NR) protocol information) for communication with a 5G network may be stored in the memory 130 and may be accessed by other components (e.g., the processor 120, the first communication processor 212, or the second communication processor 214).

Figure 3:
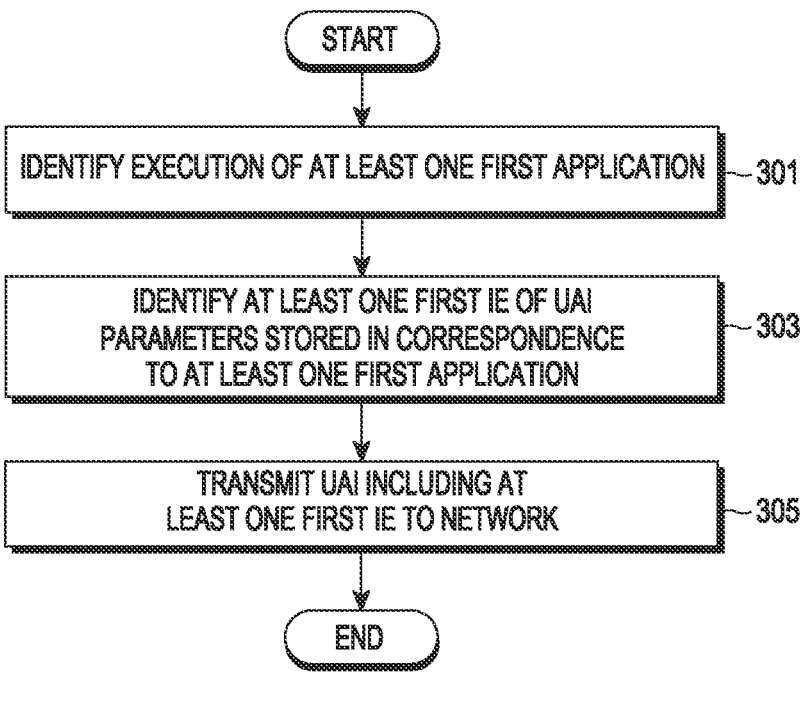
FIG. 3 is a flowchart illustrating a method of operating an electronic device according to an embodiment of the disclosure.

FIG. 3 is a flowchart illustrating a method of operating an electronic device according to an embodiment of the disclosure.

Referring to FIG. 3, according to an embodiment of the disclosure, in operation 301, the electronic device 101 (e.g., at least one of the processor 120, the first communication processor 212, the second communication processor 214, or the integrated communication processor 260) may identify execution of at least one first application. In an example, the processor 120 may execute at least one first application. The processor 120 may provide information indicating execution of at least one first application through at least one of the first communication processor 212, the second communication processor 214, and the integrated communication processor 260, but is not limited thereto. The provided information is information capable of identifying the application, and may be, for example, AppID, application properties (e.g., periodicity and/or real-time), and/or information indicating an application type, but is not limited thereto. In an example, the electronic device 101 may identify the execution of one application. In another example, the electronic device 101 may identify execution of a plurality of applications. Execution of the application herein may refer to, for example, execution in the foreground, but is not limited thereto and may also refer to execution in the background.

According to an embodiment of the disclosure, in operation 303, the electronic device 101 may identify at least one first IE of UAI parameters stored corresponding to at least one first application. In operation 305, the electronic device 101 may transmit a UAI message including at least one first IE to the network. For example, the electronic device 101 may store related information between information related to an application as illustrated in Table 1 and at least one IE.

TABLE 1

| Application-related information | Maximum value of aggregated bandwidth (BW) | Maximum number of MIMO layers | Maximum number of secondary CC |
|---|---|---|---|
| Application A | 20 | 2 | 1 |
| Application B | 20 | 3 | 1 |
| Application A and Application B | 60 | 3 | 2 |
| Application C | 80 | 3 | 2 |

The application-related information of Table 1 may include AppIDs, such as "application A", "application B", and "application C", but this is an example and there is no limitation on the type of information for identifying the application. Alternatively, the related information may include information on application properties (e.g., periodicity and/or real-time) and/or application type in place of (or additionally to) application identification information. The related information of Table 1 includes, as IEs, three IEs of Preference on maximum aggregated bandwidth (for convenience of description, it may be named as the maximum value of aggregated BW), Preference on maximum number of secondary component carriers (for convenience of description, it may be named as the maximum number of secondary CCs), and Preference on maximum number of MIMO layers (for convenience of description, it may be named as the maximum number of MIMO layers), but this is an example and the number and/or type of IEs included in the related information is not limited. For example, the relevant information illustrated in Table 1 may be generated based on at least one resource allocation history in a similar existing situation. For example, when "application A" is executed, IEs (e.g., 20 MHz of the maximum value of aggregated BW, 2 of the maximum number of MIMO layers, and 1 of the maximum number of secondary CCs) may be determined based on a history of resources allocated to the electronic device 101 (or another electronic device). For example, the electronic device 101 may generate related information as illustrated in Table 1 based on at least one history previously allocated to the electronic device 101 by the network, and the process of generating related information based on the resource allocation history will be described later. For example, the electronic device 101 may receive the related information illustrated in Table 1 from a network or receive the related information illustrated in Table 1 from a server providing a related service. For example, the network or server may generate and provide the related information as illustrated in Table 1 to the electronic device 101 based on the resource allocation history for the case of transmitting and receiving data corresponding to a specific application, which will be described later.

For example, when the electronic device 101 identifies the execution of "application A", the electronic device 101 may identify IEs (e.g., 20 MHz of the maximum value of aggregated BW, 2 of the maximum number of MIMO layers, and 1 of the maximum number of secondary CCs) corresponding to "application A" by referring to the related information illustrated in Table 1. The electronic device 101 may transmit a UAI message including the identified IEs to a network. The network may allocate resources to the electronic device 101 based on IEs included in the UAI message received from the electronic device 101. For example, the network may allocate an aggregated BW not exceeding 20 MHz to the electronic device 101, allocate two or less MIMO layers to the electronic device 101, or allocate one or less secondary CC to the electronic device 101, but is not limited thereto. As in Table 1, because different IE combinations are reflected for each "application A", "application B", and "application C", a UAI message including different IE may be transmitted according to the application to which execution is identified.

For example, when the electronic device 101 identifies the execution of "application A" and "application B", the electronic device 101 may identify IEs (e.g., 60 MHz of the maximum value of aggregated BW, 3 of the maximum number of MIMO layers, and 2 of the maximum number of secondary CCs) corresponding to "application A" and "application B" by referring to the related information illustrated in Table 1. The electronic device 101 may transmit a UAI message including the identified IEs to a network. The network may allocate resources to the electronic device 101 based on IEs included in the UAI message received from the electronic device 101. For example, the network may allocate an aggregated BW not exceeding 60 MHz to the electronic device 101, allocate three or less MIMO layers to the electronic device 101, or allocate two or less secondary CC to the electronic device 101, but is not limited thereto. Combinations of various applications other than "application A" and "application B" may be possible.

As described above, the electronic device 101 may transmit a UAI message including an IE suitable for each application to the network. For example, a data rate required for execution of "application A" may be smaller than a data rate required for execution of "application C". In this case, although the execution of "application A" requires a relatively small data rate, when 4×4 MIMO is used, 4 CCs are activated, or relatively large BW is allocated, there is a possibility that the power consumption of the electronic device 101 is large, or the resources of the network are wasted. As the electronic device 101 transmits the UAI message including the IE suitable for the corresponding application to the network, power consumption and/or resource waste may be reduced.

In the network, resources may additionally be allocated based on at least one IE included in the UAI message, not depending only on the downlink data buffer corresponding to the electronic device 101 and a service request from the electronic device 101, and accordingly, power consumption and/or waste of resources in the electronic device 101 may be reduced.

As described above, for example, when an application for voice call is executed, when a messenger application is executed, and when a video streaming application is executed, a UAI message including at least one IE suitable for each may be transmitted. Even if the electronic device 101 may operate the 4×4 MIMO mode, when executing an application (e.g., a messenger application) requiring a relatively low data, the electronic device 101 may transmit a UAI message including an IE having a relatively low MIMO layer to the network. Accordingly, for example, the electronic device 101 may transmit and receive messenger application data in a 2×2 MIMO mode. Power consumption when operating in the 4×4 MIMO mode is greater than power consumption when operating in the 2×2 MIMO mode (e.g., 70% larger), and power saving based on the 2×2 MIMO mode operation may be possible. In addition, if an application requiring a relatively high data rate (e.g., a video streaming application) is executed, a UAI message including a relatively high IE of the MIMO layer may be transmitted to the network. Accordingly, for example, the electronic device 101 may transmit and receive video streaming application data in the 4×4 MIMO mode. If a relatively low MIMO layer is allocated when a video streaming application is executed, data transmission and reception may not be smooth, but smooth data transmission and reception may be possible based on IE adjustment corresponding to the application being executed. Power consumption may be related not only to the MIMO layer, but also to the number of activated CCs and/or the size of BW, and accordingly, power consumption of the electronic device 101 may be reduced and/or smooth data transmission and reception may be possible according to the adjustment of the IE corresponding to the executed application.

Figure 4A:
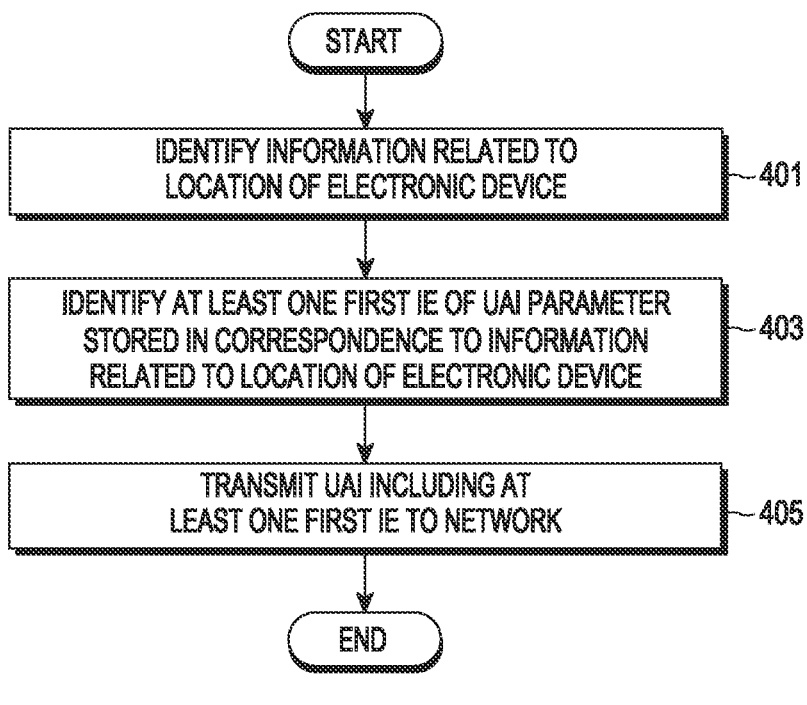
FIG. 4A is a flowchart illustrating a method of operating an electronic device according to an embodiment of the disclosure.
Figure 4B:
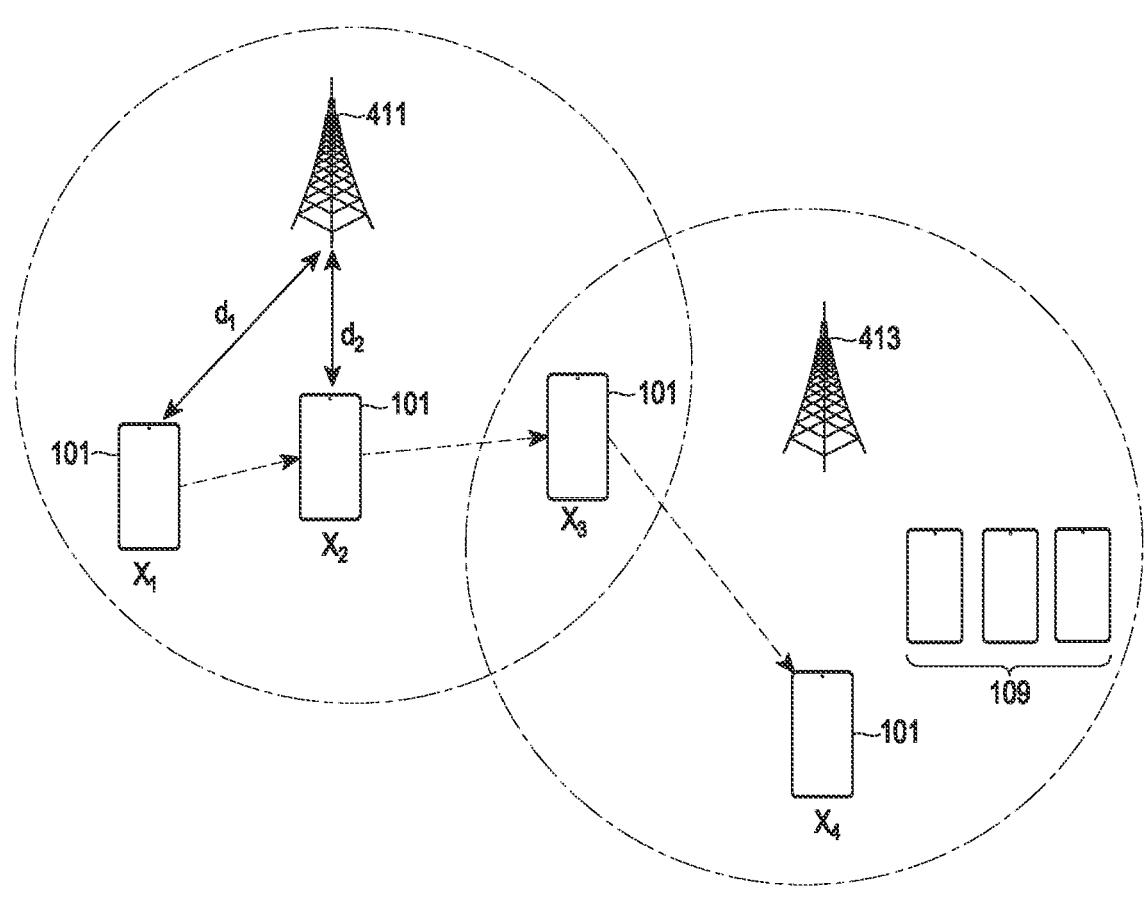
FIG. 4B is a diagram illustrating various locations of an electronic device according to an embodiment of the disclosure.

FIG. 4A is a flowchart illustrating a method of operating an electronic device according to an embodiment of the disclosure. The embodiment of FIG. 4A will be described with reference to FIG. 4B. FIG. 4B is a diagram illustrating various locations of an electronic device according to an embodiment of the disclosure.

Referring to FIG. 4A, according to an embodiment of the disclosure, in operation 401, the electronic device 101 (e.g., at least one of the processor 120, the first communication processor 212, the second communication processor 214, or the integrated communication processor 260) may identify information related to the location of the electronic device 101. For example, the location-related information may include identification information of a cell accessed by the electronic device 101, identification information of at least one neighbor cell, an electric field measurement result (e.g., reference signal received power (RSRP), reference signal received quality (RSRQ), received signal strength indication (RSSI), signal to interference plus noise ratio (SINR), but not limited) of the accessed cell and/or neighbor cell, measured global positioning system (GPS) coordinates, and/or identification information of an access point (AP) based on IEEE 802.11 (hereinafter, referred to as wireless fidelity (Wi-Fi), but is not limited as long as it is information that may be changed according to the physical movement of the electronic device 101. For example, at least one of the first communication processor 212, the second communication processor 214, and the integrated communication processor 260 may identify the cell identification information. For example, GPS coordinates and/or Wi-Fi AP identification information may be provided from the processor 120 to at least one of the first communication processor 212, the second communication processor 214, or the integrated communication processor 260, but is not limited thereto.

According to an embodiment of the disclosure, in operation 403, the electronic device 101 may identify at least one first IE of UAI parameters stored corresponding to information related to the location of the electronic device 101. The electronic device 101, in operation 405, may transmit a UAI message including at least one first IE to the network. For example, depending on the location of the electronic device 101, it may be necessary to change configurations for BW, MIMO layers, and/or the number of CCs.

Referring to FIG. 4B, when the electronic device 101 is in the first location X1, it may be spaced apart from a base station 411 by a first distance d1. Alternatively, the electronic device 101 may move to the second location X2, and in this case, the electronic device 101 may be spaced apart from the base station 411 by a second distance d2. Depending on the difference between the distances d1 and d2, there is a possibility that the electric field measured by the electronic device 101 is different. Meanwhile, those skilled in the art will understand that the electric field measurement result may depend on other conditions in addition to the distance between the electronic device 101 and the base station 411. Depending on the electric field, the allocated BW, the number of MIMO layers, and/or the number of CCs may be different. For example, when the electric field is relatively weak, a relatively small number of MIMO layers may be allocated, but this is illustrative and not limiting. For example, the electronic device 101 may store related information between an electric field measurement result for an accessed cell as illustrated in Table 2 and at least one IE.

TABLE 2

| Location-related information | Maximum value of aggregated BW | Maximum number of MIMO layers | Maximum number of secondary CC |
|---|---|---|---|
| Accessed cell: A (electric field range #1) | 20 | 2 | 1 |
| Accessed cell: B (electric field range #2) | 20 | 3 | 1 |

In the related information of Table 2, an electric field range including location-related information, identification information of an accessed cell, and an electric field measurement result may be expressed, and there is no limitation on a unit representing the electric field. Meanwhile, those skilled in the art will understand that the electric field range may be expressed as one electric field value (e.g., a single value). In this case, those skilled in the art will understand that the IE corresponding to the electric field with the smallest difference from the electric field measurement result may be selected instead of selecting the IE corresponding to the electric field range including the electric field measurement result. As described in Table 1, the relevant information illustrated in Table 2 may be generated based on at least one resource allocation history in a similar existing situation, and generation of related information may be performed by the electronic device 101, a network, and/or a server, and this may be applied to other related information of the disclosure. For example, when the electronic device 101 accesses cell A and the electric field measurement result of the serving cell is within the electric field range #1, the electronic device 101 may identify the IEs (e.g., 20 MHz of the maximum value of aggregated BW, 2 of the maximum number of MIMO layers, and 1 of the maximum number of secondary CCs) corresponding to "Accessed cell: A, electric field range #1" by referring to the related information illustrated in Table 2. The electronic device 101 may transmit a UAI message including the identified IEs to a network. The network may allocate resources to the electronic device 101 based on IEs included in the UAI message received from the electronic device 101. For example, the network may allocate an aggregated BW not exceeding 20 MHz to the electronic device 101, allocate two or less MIMO layers to the electronic device 101, or allocate one or less secondary CC to the electronic device 101, but is not limited thereto. If the electronic device 101 accesses cell A and the electric field measurement result of the serving cell is within the electric field range #2, the electronic device 101 may identify the IEs (e.g., 20 MHz of the maximum value of aggregated BW, 3 of the maximum number of MIMO layers, and 1 of the maximum number of secondary CCs) corresponding to "Accessed cell: A, electric field range #1" by referring to the related information illustrated in Table 2. The electronic device 101 may transmit a UAI message including the identified IEs to a network.

Referring to FIG. 4B, when the electronic device 101 is in the third location X3, in a status of being accessed the base station 411, the electronic device 101 may identify (or measure) a signal from the base station 413 corresponding to the neighbor cell while being accessed the base station 411. As described above, the electronic device 101 may have different BWs, the number of MIMO layers, and/or the number of CCs allocated to each location of the electronic device 101. The electronic device 101 may identify at least one IE based on the combination of the serving cell and the neighbor cell. The identified combination of the serving cell and the neighbor cell may depend on the location of the electronic device 101, and accordingly, related information corresponding to at least one IE for each serving cell and neighbor cell may be stored in the electronic device 101. For example, the electronic device 101 may store related information, such as Table 3 and/or Table 4.

TABLE 3

| Location-related information | Maximum value of aggregated BW | Maximum number of MIMO layers | Maximum number of secondary CC |
|---|---|---|---|
| Accessed cell: neighbor cell of A: B, C | 60 | 3 | 2 |
| Accessed cell: neighbor cell of A: C, D | 20 | 3 | 3 |

TABLE 4

| Location-related information | Maximum value of aggregated BW | Maximum number of MIMO layers | Maximum number of secondary CC |
|---|---|---|---|
| Accessed cell: neighbor cell of A (electric field range #1): B (electric field range #2), C (electric field range #3) | 60 | 2 | 1 |
| Accessed cell: neighbor cell of A (electric field range #2): B (electric field range #3), C (electric field range #4) | 60 | 3 | 2 |

For example, when the electronic device 101 accesses the cell A and identifies the neighbor cells of the cell B and the cell C, the electronic device 101 may identify the corresponding IEs (e.g., 60 MHz of the maximum value of aggregated BW, 3 of the maximum number of MIMO layers, and 1 of the maximum number of secondary CCs) by referring to the related information illustrated in Table 3. If the electronic device 101 accesses the cell A and identifies the neighbor cells of the cell C and the cell D, the electronic device 101 may identify the corresponding IEs (e.g., 60 MHz of the maximum value of aggregated BW, 3 of the maximum number of MIMO layers, and 3 of the maximum number of secondary CCs) by referring to the related information illustrated in Table 3. The electronic device 101 may transmit a UAI message including an IE corresponding to a combination of a serving cell and a neighbor cell to the network.

Meanwhile, for example, the electronic device 101 may access the cell A, identify the neighbor cells of the cell B and the cell C, and identify the ranges including the electric field measurement results corresponding to the cells as electric field range #1 for A, electric field range #2 for B, and electric field range #3 for C. The electronic device 101 may identify the corresponding IEs (e.g., 60 MHz of the maximum value of aggregated BW, 2 of the maximum number of MIMO layers, and 1 of the maximum number of secondary CCs) by referring to the relevant information illustrated in Table 4. Meanwhile, the electronic device 101 may access the cell A, identify the neighbor cells of the cell B and the cell C, and identify the ranges including the electric field measurement results corresponding to the cells as electric field range #2 for A, electric field range #3 for B, and electric field range #4 for C. The electronic device 101 may identify the corresponding IEs (e.g., 60 MHz of the maximum value of aggregated BW, 3 of the maximum number of MIMO layers, and 2 of the maximum number of secondary CCs) by referring to the relevant information illustrated in Table 4.

Referring to FIG. 4B, when the electronic device 101 is in the fourth location X4, the electronic device 101 may be handed over to a cell corresponding to the base station 413. BW, the number of MIMO layers, and/or the number of CCs may be different for each cell accessed by the electronic device 101. For example, the number of UEs accessing the cell corresponding to the base station 411 and the number of UEs accessing the cell corresponding to the base station 413 may be different, and in this case, resources allocated to the electronic device 101 may be different. For example, a congestion level indicating whether additional UEs 109 accessing a cell corresponding to the base station 413 is relatively numerous may be additionally considered, which will be described later. The electronic device 101 may identify at least one IE based on the serving cell. For example, the electronic device 101 may store related information between a cell and at least one IE as illustrated in Table 5.

TABLE 5

| Location-related information | Maximum value of aggregated BW | Maximum number of MIMO layers | Maximum number of secondary CC |
|---|---|---|---|
| Accessed cell: A | 60 | 3 | 2 |
| Accessed cell: B | 20 | 3 | 3 |

For example, when accessed the cell of A, the electronic device 101 may identify the corresponding IEs (e.g., 60 MHz of the maximum value of aggregated BW, 3 of the maximum number of MIMO layers, and 2 of the maximum number of secondary CCs) by referring to the related information illustrated in Table 5. If accessed the cell of B, the electronic device 101 may identify the corresponding IEs (e.g., 20 MHz of the maximum value of aggregated BW, 3 of the maximum number of MIMO layers, and 3 of the maximum number of secondary CCs) by referring to the related information illustrated in Table 5. The electronic device 101 may transmit a UAI message including an IE corresponding to the serving cell to the network.

As described above, may have different BWs, the number of MIMO layers, and/or the number of CCs allocated for each location of the electronic device 101. For example, the electronic device 101 may store related information between a cell and at least one IE as illustrated in Table 6 and/or Table 7.

TABLE 6

| Location-related information | Maximum value of aggregated BW | Maximum number of MIMO layers | Maximum number of secondary CC |
|---|---|---|---|
| WiFi-AP#1 | 60 | 3 | 2 |
| WiFi-AP#1 | 20 | 3 | 3 |

TABLE 7

| Location-related information | Maximum value of aggregated BW | Maximum number of MIMO layers | Maximum number of secondary CC |
|---|---|---|---|
| GPS range #1 | 60 | 3 | 2 |
| GPS range #2 | 20 | 3 | 3 |

For example, the electronic device 101 may identify the corresponding IEs (e.g., 60 MHz of the maximum value of aggregated BW, 3 of the maximum number of MIMO layers, and 2 of the maximum number of secondary CCs) by referring to the related information illustrated in Table 6 based on the connection to WiFi-AP #1 and/or identification of the signal from WiFi-AP #1. The electronic device 101 may identify the corresponding IEs (e.g., 20 MHz of the maximum value of aggregated BW, 3 of the maximum number of MIMO layers, and 3 of the maximum number of secondary CCs) based on the connection to WiFi-AP #2 and/or identification of the signal from WiFi-AP #2. The electronic device 101 may transmit a UAI message including an IE corresponding to the serving cell to the network.

For example, the electronic device 101 may identify the corresponding IEs (e.g., 60 MHz of the maximum value of aggregated BW, 3 of the maximum number of MIMO layers, and 2 of the maximum number of secondary CCs) by referring to the related information illustrated in Table 7 based on that the range including the current GPS coordinates identified is GPS range #1. The electronic device 101 may identify the corresponding IEs (e.g., 20 MHz of the maximum value of aggregated BW, 3 of the maximum number of MIMO layers, and 3 of the maximum number of secondary CCs) based on that the range including the current GPS coordinates identified is GPS range #2. The electronic device 101 may transmit a UAI message including an IE corresponding to the serving cell to the network.

As described above, the electronic device 101 may transmit a UAI message including the IE identified based on the application-related information and IE-related information as illustrated in Table 1 to the network. The electronic device 101 may transmit a UAI message including the IE identified based on the location-related information and IE-related information as illustrated in Table 1 to the network, such as at least some of Tables 2 to 7. Those skilled in the art will understand that the electronic device 101 may store combinations of various parameters and at least one piece of IE-related information as illustrated in Tables 1 to 7.

For example, when data is insufficient, the electronic device 101 may collect and/or analyze data for each case. If the data is sufficient, the electronic device 101 may configure priorities for each case, and may adjust the frequency of data collection and/or analysis according to the priorities. The electronic device 101 may exclude cases in which the IE cannot be determined from the case list, and may determine whether to exclude after monitoring for a predetermined time period, but is not limited thereto.

Figure 5:
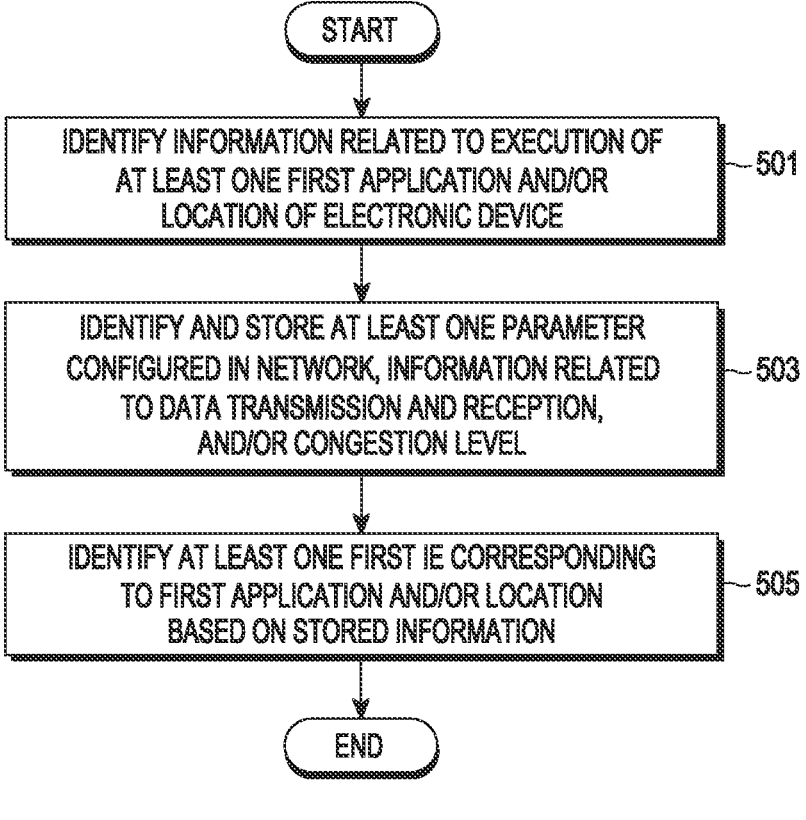
FIG. 5 is a flowchart illustrating a method of operating an electronic device according to an embodiment of the disclosure.

FIG. 5 is a flowchart illustrating a method of operating an electronic device according to an embodiment of the disclosure.

Referring to FIG. 5, a process of generating the related information as illustrated in Tables 1 to 7 described above will be described.

According to an embodiment of the disclosure, in operation 501, the electronic device 101 (e.g., at least one of the processor 120, the first communication processor 212, the second communication processor 214, or the integrated communication processor 260) may identify information related to the execution of at least one first application and/or the location of the electronic device. In operation 503, the electronic device 101 may identify and store at least one parameter configured in the network, information related to data transmission and reception, and/or a congestion level. Here, the at least one parameter configured in the network may include, for example, the number of activated CCs, the number of MIMO layers, and/or the BW allocated to each CC, but the type is not limited. The information related to data transmission and reception may include, for example, a data rate (e.g., an average data rate) and/or a data rate for each CC, but is not limited thereto. The congestion level may be information that may be determined according to the number of UEs accessing the serving cell, for example. For example, Table 8 is an example of information identified by the electronic device 101 and/or information processed based on the identified information.

TABLE 8

| Case | AppID | Serving cell/ neighbor cell (Wi-Fi) | Application category | Application periodicity | Real-time | Average data rate within data transmission section | Data rate per activated CC | MIMO layer | Average RB allocation/ channel BW (MHz) | Congestion level |
|---|---|---|---|---|---|---|---|---|---|---|
| 1 | App 1 | Cell 1/cells 2, 3, 4 | Voice call | Periodic | Yes | ~0.5 Mbps | CC1: 100% | [CC1] L1: 90% L2: 10% | CC1: 20/20 | mid |
| 2 | App 2/ App 3 | Cell 1/cells 2, 3, 4 | Browsing/ audio streaming | Random | Yes | ~2 Mbps | CC1: 90% CC2: 10% | [CC1] L2: 80% L3: 15% L4: 5% [CC2] L2: 50% L3: 50% | CC1: 20/20 CC2: 40/100 | mid |
| 3 | App 4 | Cell 5/ cells 6, 7 | SNS | Random | Yes | 0.5~10 Mbps | CC1: 60% CC2: 40% | [CC1] L1: 20% | CC1: 20/20 CC2: 60/100 | NA |

US 12,672,061 B2

21                                                                                          22

TABLE 8-continued

| Case | AppID | Serving cell/ neighbor cell (Wi-Fi) | Application category | Application periodicity | Real-time | Average data rate within data transmission section | Data rate per activated CC | MIMO layer | Average RB allocation/ channel BW (MHz) | Congestion level |
|---|---|---|---|---|---|---|---|---|---|---|
| | | | | | | | | L2: 60% L3: 20% [CC2] L2: 80% L3: 20% | | |
| 4 | App 5 | Cell 8/ cells 9, 10 | Online game | Random | Yes | ~0.5 Mbps | CC1: 100% | [CC1] L1: 28% L2: 72% | CC1: 20/100 | Low |
| 5 | App 6 | Cell 8/ cells 9, 10 | Video streaming | Periodic | No | 3~4 Mbps | CC1: 100% | [CC1] L1: 31% L2: 68% L3: 1% | CC1: 20/100 | Low |
| 6 | | Cell 8/ cells 9, 10 (Wi-Fi1) | | | | | CC1: 100% | [CC1] L1: 30% L2: 70% | CC1: 20/100 | Low |

For example, the electronic device 101 may identify the information illustrated in Table 8 based on information accumulated for each case. For example, Case 1 of Table 8 may correspond to a case where AppID is 1, a case where the combination of serving cell/neighbor cells is cell 1/cell 2, 3, and 4, a case where the application category is voice call, a case where the periodicity of the application is periodic, and/or a case where the real-time property of the application is real-time. In the case corresponding to Case 1, the average data rate in the data transmission section in Table 8, the data ratio per activated CC, the ratio of the MIMO layer, the average RB allocation/channel BW, and/or the congestion level may be identified based on at least one parameter configured in the network identified by the electronic device 101, information related to data transmission and reception, and/or the congestion level. For example, based on the plurality of identified data rates corresponding to Case 1, the electronic device 101 may identify that the average data rate within the data transmission section is, for example, 0.5 Mbps or less. For example, the electronic device 101 may identify data rates for each of a plurality of CCs corresponding to Case 1. For example, based on a plurality of measurement results corresponding to Case 1, it may be identified that 100% data transmission and reception are performed in CC #1 in response to Case 1. For example, in the measurement result corresponding to Case 1, only one CC may be allocated. For example, based on the plurality of measurement results corresponding to Case 1, it may be identified that 90% of layer 1 is measured and 10% of layer 2 is measured in CC #1. For example, based on the plurality of measurement results corresponding to Case 1, it may be identified that in CC #1, a channel BW corresponding to 20 MHz is allocated and an average allocated RB corresponds to 20 MHz. For example, based on the plurality of measurement results corresponding to Case 1, it may be identified that the congestion level is mid, and a method for identifying the congestion level will be described later. In operation 505, the electronic device 101 may identify at least one first IE corresponding to the first application and/or location based on the stored information (e.g., the average data rate within the data transmission section in Table 8, the data rate for each activated CC, the MIMO layer rate, the average RB allocation/channel BW, and/or the congestion level, but not limited thereto). The electronic device 101 may correspond the identified at least one first IE to the first application and/or location, and accordingly, for example, related information (or related information, such as Table 9 to be described later), such as Tables 1 to 7 may be generated. In the process of generating the relevant information, additional information other than the identified information (e.g., application category, real-time, periodicity in Table 8, but not limited thereto) may be further considered. A configuration in which related information is generated based on stored information will be described later.

For example, the electronic device 101 may also identify the average data rate within the data transmission section in Table 8, the data rate for each activated CC, the MIMO layer rate, the average RB allocation/channel BW, and/or the congestion level for Case 2 of Table 8. In Case 2, two applications may run concurrently. Corresponding to Case 2, a case where two CCs are allocated may also be measured, and for example, the data rate for each activated CC may be identified as 90% for CC #1 and 10% for CC #2. The ratio to which the MIMO layer is allocated may also be identified for each CC. For example, in CC #1, it may be identified that the rate allocated to layer 2 is 80%, the rate allocated to layer 3 is 15%, and the rate allocated to layer 4 is 5%. In CC #2, it may be identified that the ratio allocated to layer 2 is 50% and the ratio allocated to layer 3 is 50%. Average RB allocation and channel BW may also be identified for each CC. For example, in Case 6 (e.g., serving cell: 8, neighbor cells: 9, 10, Wi-Fi #1) of Table 8, the same measurement result may be identified for all applications, and accordingly, information related to the application of Case 6 (e.g., AppID, application category, periodicity, and real-time) may not be reflected. Based on the identified information for each case as illustrated in Table 8, for example, related information as illustrated in Table 9 may be generated. As described above, the subject of generating the related information may be the electronic device 101, but is not limited thereto.

TABLE 9

| | | At least one IE of UAI | | |
|---|---|---|---|---|
| Case | Sub-case | Maximum number of MIMO layers | Maximum number of secondary CC | Maximum value of aggregated BW |
| 1 | | 2 | 1 | 20 |
| 2 | 2-1 | 3 | 1 | 20 |

TABLE 9-continued

| | | At least one IE of UAI | | |
| Case | Sub-case | Maximum number of MIMO layers | Maximum number of secondary CC | Maximum value of aggregated BW |
|---|---|---|---|---|
| | 2-2 | 3 | 2 | 60 |
| 3 | — | | | |
| 4 | | 2 | 1 | 40 |
| 5 | | 2 | 1 | 40 |
| 6 | | 2 | 1 | 40 |

Examples in which at least one IE is configured for each case will be described with reference to Tables 8 and 9 together. For example, an example in which the IE of the number of MIMO layers for Case 1 is configured will be described. For example, referring to Case 1, the electronic device 101 may map and store at least one IE of Case 1 of Table 1 for App1 belonging to the voice call category. A voice call, as identified in the history measured in Table 8, has a relatively small average data rate (e.g., 0.5 or less), and may have periodicity of transmitting and receiving data at a period of, for example, 20 ms. In this case, a number of cases in which the network configures the number of MIMO layers to one may occur. When the layer is 2, power consumption may be about 1.7 times greater than when the layer is 1. As in Case 1 of Table 8, the configured ratio of layer 1 to CC1 may be 90%, and the ratio configured for layer 2 may be 10%. The electronic device 101 may configure the maximum number of MIMO layers to 2 as illustrated in Table 9 for the case where layer 2 is allocated even though the ratio of layer 2 is relatively low. In another example, the maximum number of MIMO layers may be configured as 1 based on that the configured ratio of layer 1 being relatively high. As described above, the maximum number of IEs of the MIMO layer may be determined based on, for example, an allocation ratio of the MIMO layer, but is not limited thereto.

For example, an example in which the IE of the maximum number of secondary CCs for Case 1 is configured is described. For example, the IE of the maximum number of secondary CCs may be determined based on the data rate for each activated CC in Table 8. For example, the data rate for each activated CC in Case 1 in Table 8 may be identified with a history of 100% data transmission and reception by CC1, and this may mean that CA is not performed relatively, and/or a relatively small CC is performed. Based on this, the electronic device 101 may configure the maximum number of secondary CCs to 1, for example, as illustrated in Table 9, but is not limited thereto.

For example, an example in which the IE of the maximum value of aggregated BW for Case 1 is configured will be described. For example, the IE of the maximum aggregated BW may be determined based on the average RB allocation and/or channel BW in Table 8. For example, the average RB allocation and channel BW in Case 1 in Table 8 may be 20 MHz and 20 MHz, respectively. The electronic device 101 may determine the IE of the maximum value of Aggregated BW in Table 9 as 20 MHz based on that the average RB allocation is 20 MHz, but is not limited thereto. For example, the electronic device 101 may determine the IE of the maximum value of aggregated BW in Table 9 as 20 MHz based on the fact that the channel BW is 20 MHz, but is not limited thereto. The electronic device 101 may additionally (or alternatively) use, for example, average RB allocation and/or deviation of channel BW to determine the IE of the maximum value of aggregated BW.

For example, an example in which at least one IE for Case 2 is configured is described. Case 2 may be an example in which two applications respectively operate in the foreground and background, but is not limited thereto. Although the two applications operate, the average data rate (e.g., less than 2 Mbps) may be relatively low. In addition, only one CC may be activated mainly (e.g., at a rate of 90%), and then two CCs may be activated at a rate of about 10%. Because the layer 4 allocation ratio of CC1 is relatively low at 5%, even when operating as layer 3, performance may not be greatly affected, and thus the maximum number of IEs of the MIMO layer in Table 9 may be determined to be 3. Meanwhile, because the data rate and congestion level are relatively low, there is room for additional resource allocation, in the case where normal reception is possible even without using CC2, the maximum number of secondary CCs may be configured as 1 as subcase 2-1. Meanwhile, for subcase 2-2 to which a more conservative criterion is applied, the maximum number of secondary CCs may be configured as 2. The IE of maximum value of the aggregated BW may be determined based on RB allocation and/or channel BW, for example. The channel BW of CC1 and CC2 is likely to be allocated 20+100=120 MHz for two CCs, but may be configured as 20 (CC1)+40 (CC2)=60 MHz based on average RB allocation. For example, the network may allocate a bandwidth part (BWP) of 40 MHz for CC2 of the corresponding UE based on that 40 MHz is included in the IE of the maximum aggregated BW of the UAI of CC2, but there are no limits on the use. For example, Case 3 is described. In Case 3, because the data rate (e.g., 0.5 to 10 Mbps) variance is relatively large and the maximum value (e.g., 10 Mbps) of the data rate is relatively large, it may be expected that CC2 will be utilized frequently. Accordingly, in Case 3, the electronic device 101 may not map and store the IE.

For example, an example in which at least one IE for Cases 4, 5, and 6 is configured is described. Cases 4 and 5 may be cases in which different applications (e.g., App5 and App6) are executed in the same location (e.g., serving cell: 8, neighbor cell: 9, 10). In both cases, only one CC is allocated, and it may be identified that the allocation ratio of layer 3 is relatively low. Based on this, for cases 4 and 5, the electronic device 101 may configure the maximum number of IEs of the MIMO layer to 2, configure the IE of the maximum number of secondary CCs to 1, and configure the IE of the maximum value of the aggregated BW to 40 MHz. In this way, when the same (or similar) IE is configured even when various applications are executed in the same location, the electronic device 101 may configure a case in which application information is excluded, such as Case 6. For Case 6, the electronic device 101 may additionally store Wi-Fi AP information and/or GPS information as more detailed location information. For example, when Case 6 is configured, Cases 4 and 5 may be deleted or used for reference, but are not limited thereto.

For example, the electronic device 101 may update a list, such as Table 8 and/or Table 9 periodically or when a change in information is identified. Based on this update, relevant information that is robust against changes in use patterns, changes in wireless environments, and changes in data characteristics of applications may be generated.

Meanwhile, although not illustrated in Table 8, the electronic device 101 may further store and/or manage, for example, a use time zone, an average number of accesses (e.g., per week), and/or an average use time per time. For example, because scheduling characteristics and/or congestion levels of base stations may be different for each use time zone, additional information may be further used. The use time zone, for example, may be defined by dividing 24 hours into a specific number of sections, but is not limited thereto. For example, for applications that users use frequently and use a lot of time among applications that use data communication, actual use frequency and use time, whether the corresponding app is real-time, whether data is periodic, average data rate and/or deviation of the actual data transmission section may be stored and/or managed. When the frequency of use satisfies the specified conditions (for example, when the number of uses per week is 10 or more and the average use time is 20 minutes or more), the app may be used for data collection, and when the frequency of use or the time of use is relatively low or short, data collection may not be performed, but is not limited thereto.

For example, as the data rate, an overall average data rate may be used, or an average data rate in a section in which data is actually transmitted may be used. For example, in the case of an application that performs periodic data transmission and reception, the average data rate may be as low as 1 Mbps, but in the section where actual data is transmitted, the data rate may be as high as 5 Mbps or more, and in some cases, peak-data rates may exceed 10 Mbps. In this case, if the determination is made based on the overall average data rate of 1 Mbps, a problem may arise in performance, so the average data rate of the actual data transmission section and/or peak data rate may be used to determine the IE.

For example, analysis of an application may be performed while operating in the foreground, but may also be performed, for example, while operating in the background in the case of an application, such as audio streaming, and as described in Case 2 of Table 8, a case of simultaneous execution of two or more applications may also be analyzed.

For example, whether an application is real-time may be determined based on a data transmission/reception pattern of the application and/or may be received from another device. A characteristic of allocating a channel when a corresponding application is executed by a base station accessed from a location where a user usually stays may also be an object of data collection and analysis. Because the MIMO layer is mainly allocated based on the radio channel environment received by the user, it has little relation to the type of application and may be highly dependent on the radio channel environment of the location where the user stays. The radio channel environment in a specific place may change slightly depending on time or circumstances, but may not change significantly unless cell design is changed. Referring to base station statistics, the rate at which base stations allocate layer 4 is about 10 to 15%, and there may be a relatively large number of areas allocated only to layer 1 or layer 2. Therefore, the statistics for each MIMO layer allocated by the base station accessed by the user may be used to configure the maximum number of IEs of the MIMO layer. In addition, the number of CCs allocated by the base station, the activation ratio of each CC, the BW for each CC, and/or the data rate may also be subject to data collection and analysis. In the case of BW, not only the BW of the CC itself but also the BW of the RB actually allocated by the base station may be considered. For example, when the BW of CC 1 is 100 MHz, but the RB actually allocated by the base station is 20 MHz or less, the corresponding CC may consider a value of 20 MHz to select the maximum value of the aggregated BW. In addition, a congestion level should also be considered when determining the IE, but a method for the electronic device 101 to identify the congestion level will be described later.

For example, the electronic device 101 may perform data collection and/or analysis as described above for all locations and/or all applications. Alternatively, the electronic device 101 may first select a location where the cellular data communication use time is longer than a specific time while staying for a specific time period, and then select an application that is frequently used and/or used for a long time at the selected location. The electronic device 101 may then collect and/or analyze data on the selected location and/or selected application. Based on the above analysis, the electronic device 101 may classify cases in which similar characteristics are repeated and/or specified conditions are satisfied, for example, as illustrated in Tables 8 and/or 9.

According to an embodiment of the disclosure, the electronic device 101 may update related information. For example, when a network configuration is changed or data transmission/reception characteristics of an application are changed, the electronic device 101 may update related information by using the corresponding history. For example, data transmission/reception characteristics may be changed as frequently stayed locations by the users are changed and/or added, frequently used applications are changed and/or added, the CC combination is changed as the base station is upgraded, electric field characteristics are changed, or applications are updated. The electronic device 101 may adjust at least a part of at least one IE corresponding to a case in the related information, add a new case, and/or delete an existing case. For example, the electronic device 101 may add a new case corresponding to a new location. For example, the electronic device 101 may delete an existing case that has not been detected for a certain period of time.

Figure 6A:
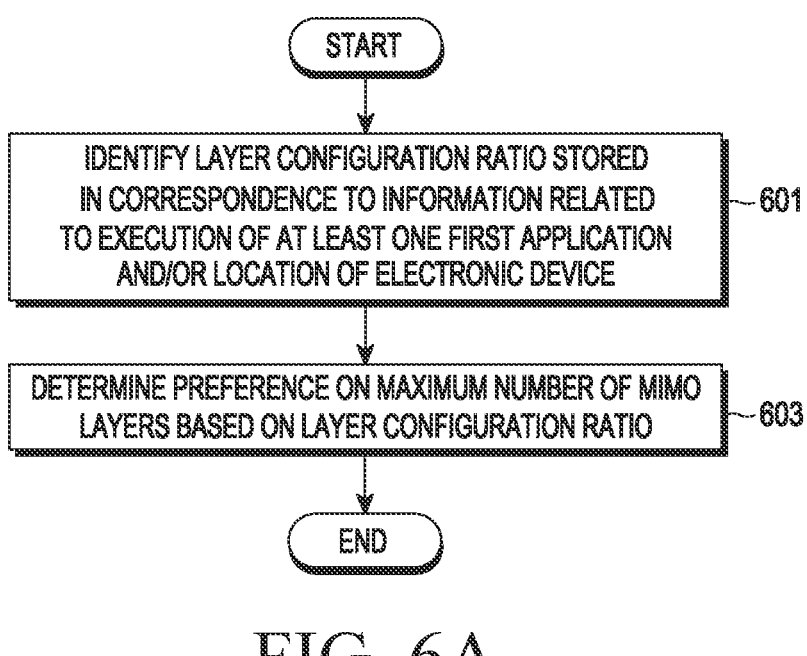
FIG. 6A is a flowchart illustrating a method of operating an electronic device according to an embodiment of the disclosure.

FIG. 6A is a flowchart illustrating a method of operating an electronic device according to an embodiment of the disclosure.

Referring to FIG. 6A, according to an embodiment of the disclosure, in operation 601, the electronic device 101 (e.g., at least one of the processor 120, the first communication processor 212, the second communication processor 214, or the integrated communication processor 260) may identify the layer configuration ratio stored corresponding to information related to the execution of at least one first application and/or the location of the electronic device. In operation 603, the electronic device 101 may determine the IE of the preference on maximum number of MIMO layers based on the layer configuration ratio. For example, as described with reference to Table 8, the electronic device 101 may store and/or manage the configured ratio of layer 1, configured ratio of layer 2, configured ratio of layer 3, and/or configured ratio of layer 4 based on the existing histories of multiple times, in response to information related to the execution of at least one first application and/or the location of the electronic device. The configured ratio of layer 1 may be a value obtained by dividing the number of times layer 1 is configured by the total number of times, but is not limited thereto. As described above, the maximum number of IEs of the MIMO layer may be determined based on an allocation ratio (e.g., statistical information) of MIMO layers allocated by the network. For example, when there is no history of allocation of layer 4 during the data collection period, the location is highly likely to be a medium and weak electric field that is difficult to allocate layer 4, and the electronic device 101 may configure the IE corresponding to the location to layer 3.

For example, in the case of referring to the MIMO layer allocation ratio, when the ratio of a specific layer (e.g., a relatively high layer) is relatively low, the impact on performance may be small even if the MIMO layer is lowered. For example, when the layer 4 allocation rate is 5% or less, even if layer 3 is configured, only about 1% of resources need to be additionally allocated, so layer 3 may be configured.

Figure 6B:
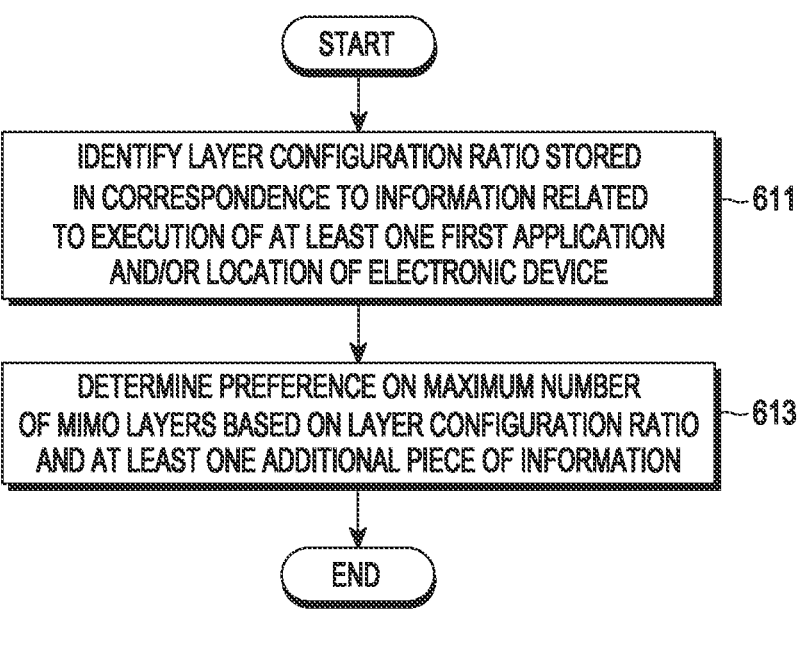
FIG. 6B is a flowchart illustrating a method of operating an electronic device according to an embodiment of the disclosure.

FIG. 6B is a flowchart illustrating a method of operating an electronic device according to an embodiment of the disclosure.

Referring to FIG. 6B, according to an embodiment of the disclosure, in operation 611, the electronic device 101 (e.g., at least one of the processor 120, the first communication processor 212, the second communication processor 214, or the integrated communication processor 260) may identify the layer configuration ratio stored corresponding to information related to the execution of at least one first application and/or the location of the electronic device. In operation 613, the electronic device 101 may determine the IE of the preference on maximum number of MIMO layers based on the layer configuration ratio and at least one additional piece of information.

For example, when the allocation ratio of a relatively high layer by the network is not too low, such as 5 to 15%, the electronic device 101 may determine the maximum number of IEs of MIMO layer based on a congestion level and/or additional information on whether an application is real-time. The congestion level may indicate whether sufficient resources are currently allocated to the electronic device 101 and/or a degree of additionally allocated resources to the electronic device 101, but is not limited thereto. When the congestion level is relatively high, it may indicate that sufficient resources are not allocated to the electronic device 101. For example, when the congestion level is relatively high, it may indicate that data to be received by the electronic device 101 is stored in a buffer of the network, and thus a delay occurs. For example, when the congestion level is relatively high, it may indicate that the electronic device 101 has a low capacity to allocate additional resources.

For example, the real-time nature of an application may be a criterion for determining the extent to which usability is affected when network configurations are reduced. Applications having real-time properties may be sensitive to delay. For example, the data rate and/or the congestion level may be configured differently depending on whether the application has real-time. For example, when the application has real-time, as criteria for lowering the layer, a relatively high layer allocation ratio of less than 10%, an average data rate of 2 Mbps or less, a peak-data rate of 3 Mbps or less, and low congestion level may be configured. For example, when the application does not have real-time, as criteria for lowering the layer, a relatively high layer allocation ratio of less than 15%, an average data rate of 5 Mbps or less, a peak-data rate of 6 Mbps or less, and medium or high congestion level may be configured. As described above, the maximum number of IEs of the MIMO layer may be configured differently based on whether the application has real-time. Meanwhile, the maximum number of IEs of the MIMO layer may be configured differently according to the electric field. For example, when the MIMO layer is reduced in a weak electric field, there is a possibility of deterioration in reception performance, so the electronic device 101 may further strengthen the criterion for configuring the maximum number of IEs of the MIMO layer to a relatively small value in a weak electric field, compared to a strong electric field. In addition, the electronic device 101 may further use a bit error rate (BER) as additional information.

Figures 7A, 7B:
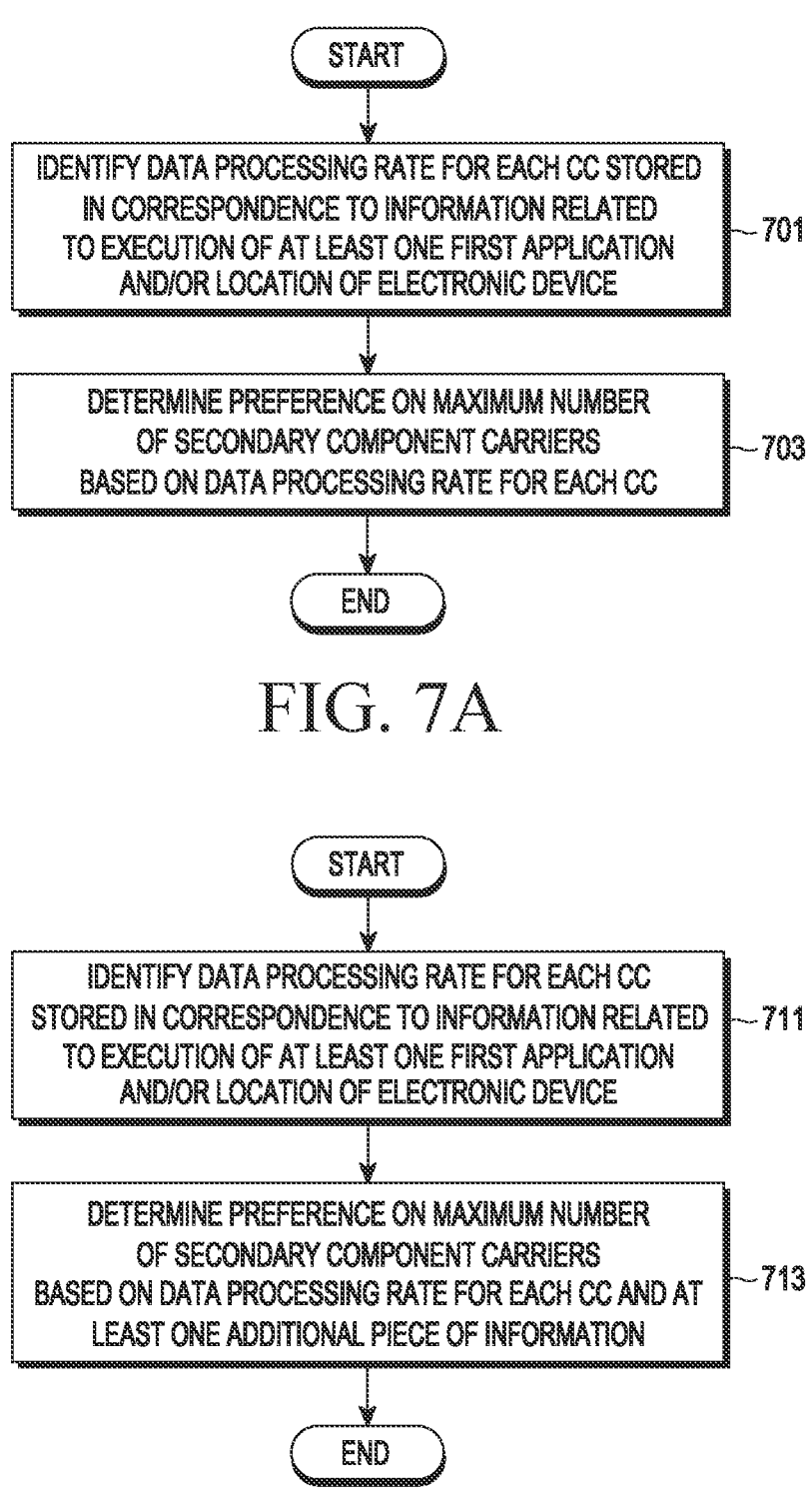
FIG. 7A is a flowchart illustrating a method of operating an electronic device according to an embodiment of the disclosure.
FIG. 7B is a flowchart illustrating a method of operating an electronic device according to an embodiment of the disclosure.

FIG. 7A is a flowchart illustrating a method of operating an electronic device according to an embodiment of the disclosure.

Referring to FIG. 7A, according to an embodiment of the disclosure, in operation 701, the electronic device 101 (e.g., at least one of the processor 120, the first communication processor 212, the second communication processor 214, or the integrated communication processor 260) may identify the data processing rate for each CC stored corresponding to information related to the execution of at least one first application and/or the location of the electronic device. In operation 703, the electronic device 101 may determine the IE of the preference on maximum number of secondary component carriers based on the data processing rate for each CC. The base station may determine whether to activate the CC mainly based on the downlink data buffer status. When the amount of data in the buffer occasionally exceeds the threshold for a relatively short time, the network may activate CC, but in this case the amount of data actually received may be relatively small. In this case, it may be advantageous for the electronic device 101 in terms of power consumption not to additionally activate the CC. Accordingly, the IE may be determined so that a CC using data transmission/reception at a relatively low rate is not activated. For example, when the data transmission/reception rate by CC2 is relatively low, such as 5%, the electronic device 101 may configure the IE so that the corresponding CC is not activated.

FIG. 7B is a flowchart illustrating a method of operating an electronic device according to an embodiment of the disclosure.

Referring to FIG. 7B, according to an embodiment of the disclosure, in operation 711, the electronic device 101 (e.g., at least one of the processor 120, the first communication processor 212, the second communication processor 214, or the integrated communication processor 260) may identify the data processing rate for each CC stored corresponding to information related to the execution of at least one first application and/or the location of the electronic device. In operation 713, the electronic device 101 may determine the IE of the preference on maximum number of secondary component carriers based on the data processing rate for each CC and at least one additional piece of information. For example, the electronic device 101 may determine the IE of the maximum number of secondary CCs by considering the congestion level of the primary carrier component as additional information. For example, the electronic device 101 may determine the IE of the maximum number of secondary CCs by considering the average data rate as additional information. When the average data rate exceeds the reference value, the electronic device 101 may not decrease the maximum number of CCs. For example, when the data reception rate of the secondary carrier component is less than 10%, the average data rate is 3 Mbps or less, and the congestion level of the primary carrier component is low or mid, the IE may be adjusted so that the number of carriers is 1.

Figure 8:
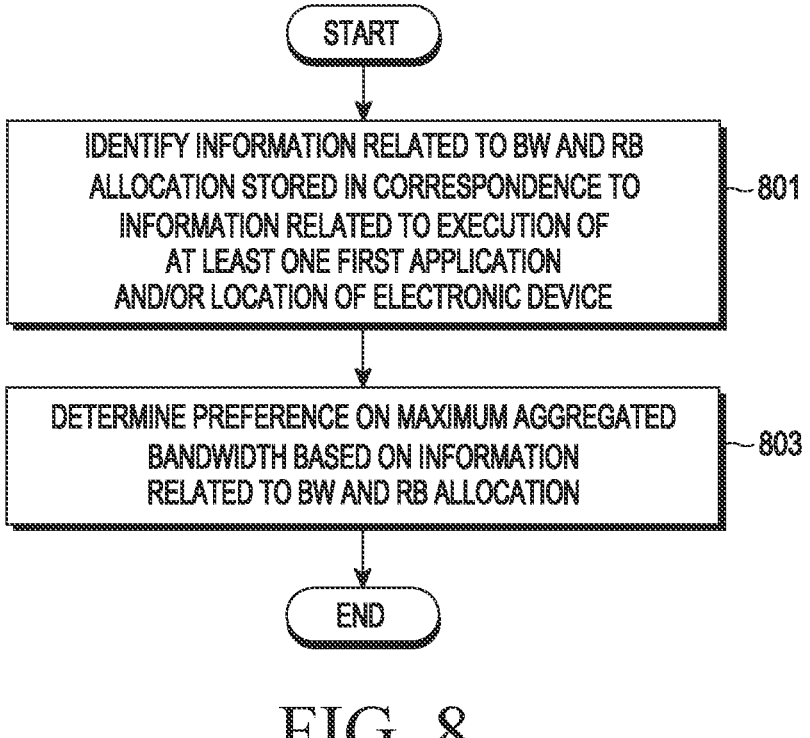
FIG. 8 is a flowchart illustrating a method of operating an electronic device according to an embodiment of the disclosure.

FIG. 8 is a flowchart illustrating a method of operating an electronic device according to an embodiment of the disclosure.

Referring to FIG. 8, according to an embodiment of the disclosure, in operation 801, the electronic device 101 (e.g., at least one of the processor 120, the first communication processor 212, the second communication processor 214, or the integrated communication processor 260) may identify information related to BW and RB allocation stored corresponding to information related to the execution of at least one first application and/or the location of the electronic device. In operation 803, the electronic device 101 may determine the IE of the preference on maximum aggregated bandwidth based on information related to BW and RB allocation. For example, the IE of the maximum value of the aggregated BW may be determined based on the average and/or deviation of RBs allocated for each CC. For example, when the average BW is relatively small (or when it is small compared to the total channel BW) and/or when the BW deviation is small, the IE may be configured so that the BW is reduced. For example, even though the total channel BW is 100 MHz, when the actually allocated RB is 40 MHz or less, the electronic device 101 may configure 40 MHz as the IE of the maximum value of the aggregated BW. When the deviation of the allocated BW is large, the electronic device 101 may configure the IE of the maximum value of the aggregated BW based on the maximum value of the BW or the total channel BW of the corresponding CC. For example, the electronic device 101 may configure the IE of the maximum value of the aggregated BW by further considering the additional information, and the type of additional information is not limited.

Figure 9A:
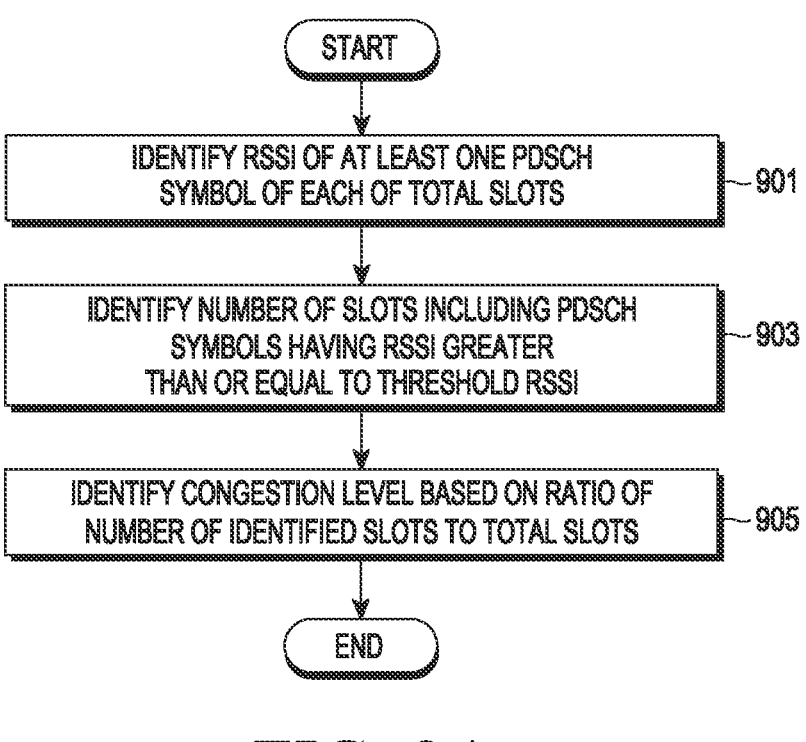
FIGS. 9A and 9B are flowcharts illustrating a method of operating an electronic device according to various embodiments of the disclosure.
Figure 9B:
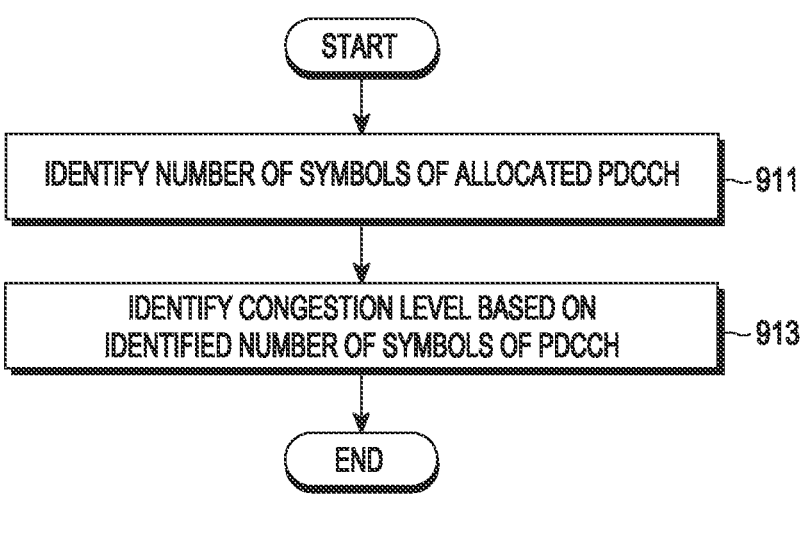

FIGS. 9A and 9B are flowcharts illustrating a method of operating an electronic device according to various embodiments of the disclosure.

Referring to FIG. 9A, according to an embodiment of the disclosure, in operation 901, the electronic device 101 (e.g., at least one of the processor 120, the first communication processor 212, the second communication processor 214, or the integrated communication processor 260) may identify the RSSI of at least one PDSCH symbol of each of total slots of a physical downlink shared channel (PDSCH). For example, the electronic device 101 may identify the RSSI of the first PDSCH symbol of each of total slots, but there is no limit on symbols to be identified in the slot. In addition to RSSI, any indicator capable of indicating reception strength or electric field may be used alternatively or additionally. In operation 903, the electronic device 101 may identify the number of slots including PDSCH symbols having an RSSI greater than or equal to a threshold RSSI. For example, when data is transmitted from the network to the electronic device 101 or another electronic device, symbols of a physical downlink control channel (PDCCH) and PDSCH may be sequentially used. The electronic device 101 decodes the symbols of the PDCCH, and when there is data to be transmitted to the electronic device 101 based on the decoding result, the symbols of the PDSCH may be used. Because it takes time to perform the process, the electronic device 101 receives and stores the PDSCH symbol in advance before decoding of the PDCCH symbol is completed, and then if the data is not for the electronic device 101, the data of the PDSCH symbol may be discarded. The electronic device 101 may measure the RSSI of at least one PDSCH symbol of the PDSCH before discarding, and identify whether the RSSI is greater than or equal to a threshold RSSI. When the RSSI is greater than or equal to the threshold RSSI, it may mean that the corresponding slot is used for data for the electronic device 101 or another electronic device. In operation 905, the electronic device 101 may identify the congestion level based on the ratio of the number of identified slots to total slots. There is no limit on how to express the congestion level. For example, when the ratio is 30% or less, the congestion level may be expressed as low, when the ratio is greater than 30% and less than 70%, the congestion level may be expressed as mid, and when the ratio is greater than 70% and less than 100%, the congestion level may be expressed as high. In an example, the electronic device 101 may map and store the congestion level with a specific time zone. When the deviation of the congestion level is large, the electronic device 101 may store information indicating that the congestion level cannot be specified (e.g., it may be expressed as NA).

Referring to FIG. 9B, according to an embodiment of the disclosure, in operation 911, the electronic device 101 (e.g., at least one of the processor 120, the first communication processor 212, the second communication processor 214, or the integrated communication processor 260) may identify the number of symbols of the allocated PDCCH. In operation 913, the electronic device 101 may identify the congestion level based on the identified number of symbols of the PDCCH. For example, 1 to 3 symbols of the PDCCH may be allocated, and generally, as the number of users connected to a cell increases, the number of symbols of the PDCCH may also increase. Accordingly, the electronic device 101 may identify the congestion level based on the number of symbols of the allocated PDCCH.

As described above, the electronic device 101 may use the identified congestion level to determine at least one IE. For example, when 2×2 MIMO is allocated at 20 MHz BW, data reception of 150 Mbps is possible. Considering that most services excluding large-capacity downloads are available at a data rate of 10 Mbps or less, even if the electronic device 101 receives data with layer 2 or single layer MIMO and minimum BW, a stable service may be performed. However, when there are many users in a specific cell, because the resources allocated to each UE may decrease, the max data that the electronic device 101 may receive may eventually be determined according to the number of allocated CCs, channel conditions, and the number of users in the specific cell. However, because the electronic device 101 cannot identify the number of users in the corresponding cell, it may be difficult to ensure the accuracy of the efficiency of the IE determined only by the required data rate. Accordingly, the electronic device 101 may determine at least one IE by using the congestion level identified based on the above-described process.

Figure 10A:
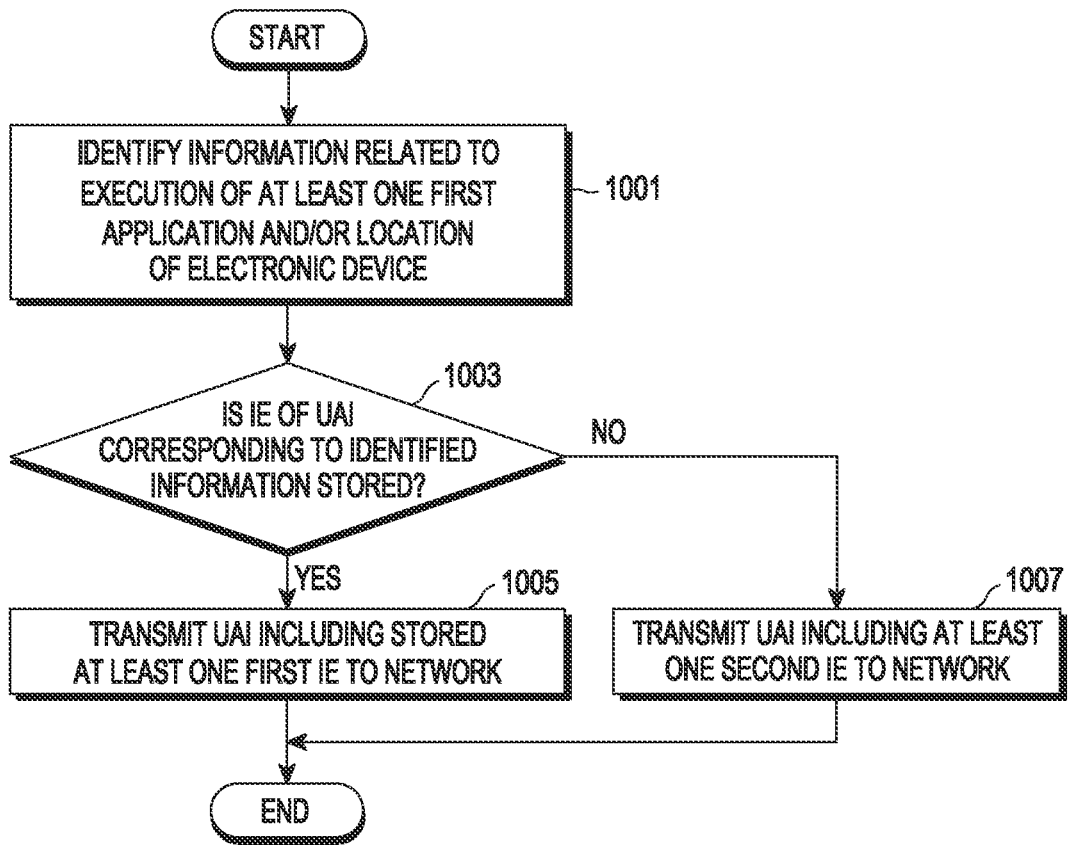
FIG. 10A is a flowchart illustrating a method of operating an electronic device according to an embodiment of the disclosure.

FIG. 10A is a flowchart illustrating a method of operating an electronic device according to an embodiment of the disclosure.

Referring to FIG. 10A, according to an embodiment of the disclosure, in operation 1001, the electronic device 101 (e.g., at least one of the processor 120, the first communication processor 212, the second communication processor 214, or the integrated communication processor 260) may identify information related to the execution of at least one first application and/or the location of the electronic device. In operation 1003, the electronic device 101 may identify whether the IE of the UAI message corresponding to the identified information is stored in the electronic device 101. If the IE of the UAI message corresponding to the identified information is stored in the electronic device 101 (1003— Yes), the electronic device 101, in operation 1005, may transmit the UAI message including the stored at least one first IE to the network. If the IE of the UAI message corresponding to the identified information is not stored in the electronic device 101 (1003—No), the electronic device 101, in operation 1007, may transmit the UAI message including the stored at least one second IE to the network. Meanwhile, the electronic device 101 may be configured not to transmit a UAI message to the network. For example, when the electronic device 101 is located in an unregistered location (e.g., home or work), the electronic device may be configured not to transmit the UAI message, but is not limited thereto. The at least one second IE may be at least partially different from the at least one first IE, but may be identical in some cases. The at least one second IE may, for example, be configured based on the current status (e.g., overheating status and/or low power status) of the electronic device 101, configured as a UAI parameter configured by the network, or may be a default UAI parameter, but there is no limit on how to configure the at least one second IE. Meanwhile, the electronic device 101 may transmit a UAI message including an IE corresponding to the same location and/or execution of the same application after the RRC connection is released.

Figure 10B:
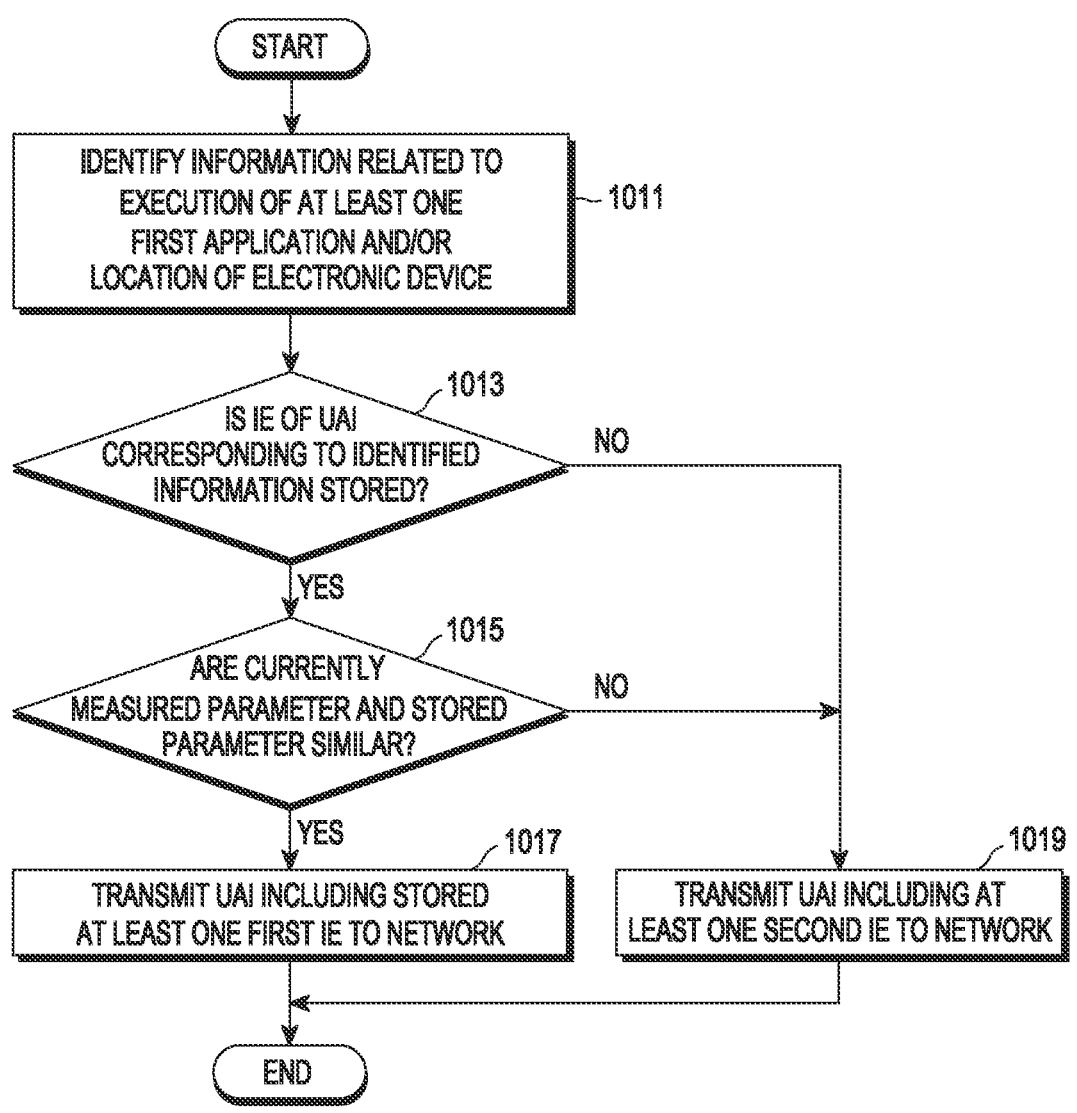
FIG. 10B is a flowchart illustrating a method of operating an electronic device according to an embodiment of the disclosure.

FIG. 10B is a flowchart illustrating a method of operating an electronic device according to an embodiment of the disclosure.

Referring to FIG. 10B, according to an embodiment of the disclosure, in operation 1011, the electronic device 101 (e.g., at least one of the processor 120, the first communication processor 212, the second communication processor 214, or the integrated communication processor 260) may identify information related to the execution of at least one first application and/or the location of the electronic device. In operation 1013, the electronic device 101 may identify whether the IE of the UAI message corresponding to the identified information is stored in the electronic device 101. If the IE of the UAI message corresponding to the identified information is not stored in the electronic device 101 (1013—No), the electronic device 101, in operation 1010, may transmit the UAI message including at least one second IE to the network. If the IE of the UAI message corresponding to the identified information is stored in the electronic device 101 (1013—Yes), the electronic device 101, in operation 1015, may identify whether the currently measured parameter and the stored parameter are similar. For example, the electronic device 101 may store an additional parameter for a corresponding case in addition to the related information of Table 9. For example, the criterion for applying at least one IE of Case 1 of Table 9 may further consider additional parameters (e.g., MIMO allocation, CC allocation, congestion level, time zone, data rate, but not limited thereto) as well as application-related information and/or location-related information. For example, referring to Table 8, the average data rate of Case 1 is 0.5 Mbps or less, the congestion level is mid, and the time zone may be, for example, 06:00 to 12:00. For example, the electronic device 101 may identify that the execution and serving cell of App1 is 1, and the neighbor cells are 2, 3, and 4. In this case, the electronic device 101 may identify whether the currently measured parameters are similar to the stored parameters without immediately applying the IE corresponding to Case 1. For example, the electronic device 101 may identify that the average data rate is 0.4 Mbps, the congestion level is mid, and the current time is 08:00, and accordingly, identify that the currently measured parameter is similar to the stored parameter. The criterion for judging similarity is not limited. For example, similarity may be determined based on a matching ratio of a plurality of parameters, and priority may be given to some parameters, but the criteria are not limited. When it is determined that the currently measured parameter is similar to the stored parameter (1015—Yes), in operation 1017, the electronic device 101 may transmit a UAI message including the stored at least one first IE to the network. When it is determined that the currently measured parameter is not similar to the stored parameter (1015—No), in operation 1019, the electronic device 101 may transmit a UAI message including at least one second IE to the network. In an example, the electronic device 101 may identify that the average data rate is 10 Mbps, the congestion level is low, and the current time is 15:00, and accordingly, it may be identified that the currently measured parameters are not similar to the stored parameters. In this case, the electronic device 101 may be configured to transmit a UAI message including an IE different from the stored at least one first IE.

For example, identification of whether the currently measured parameter is similar to the stored parameter, such as operation 1015, may be performed when an RRC connection is set up or when moving to another cell through handover, but there is no limit to the trigger of the identification, and it may be performed periodically in some cases.

Because the UAI message is an RRC message, it needs to be controlled so as not to be transmitted too frequently. Even if a specific case in Table 9 is detected, the electronic device 101 according to an embodiment may transmit a UAI message including an IE corresponding to the case when the period for which the corresponding case is maintained is longer than or equal to the threshold period. If the period for which the corresponding case is maintained is less than the critical period, the electronic device 101 may be configured not to transmit the UAI message including the IE corresponding to the corresponding case. For example, the electronic device 101 may execute a video streaming application in the foreground, then execute an SNS messaging application in the foreground for a period less than a threshold period, and then execute the video streaming application again in the foreground. In this case, when the electronic device 101 transmits the UAI message including the stored IE corresponding to the SNS messaging application, it may be rather inappropriate for data transmission and reception of the video streaming application. Accordingly, the electronic device 101 may transmit the UAI message including the IE corresponding to the case when the period for which the corresponding case is maintained is longer than or equal to the threshold period.

As described above, only the method of adjusting the IE of the UAI message based on the identification of the overheating status and/or the low power status is disclosed, and a method of adjusting the IE of the UAI message based on information on resources previously allocated in the network is not disclosed.

For example, when a specific electronic device downloads large amounts of data, and the number of users in a cell is large, the average data rate may be low if the number of users in the cell is high and the base station is unable to allocate sufficient resources to specific electronic devices. If the specific electronic device configures the IE of the UAI message based on the average data rate, despite the download of large data, there is a possibility that the maximum number of CCs or the maximum number of MIMO layers may be reduced, and thus service quality may be deteriorated. Alternatively, when a video streaming service is performed, data reception is performed while data is buffered, but data reception may not be performed during the remaining period. In this situation, it has not been disclosed what criteria the electronic device should determine the network configuration based on. For example, because the data rate is relatively high when receiving data, it may be necessary to select whether it is advantageous to maintain a high data rate configuration, such as 4×4 MIMO and carrier aggregation (CA) while accepting current consumption, or whether it is advantageous to reduce current consumption by reducing the number of MIMO layers and/or CCs because buffered data is not real-time data.

According to an embodiment of the disclosure, an electronic device 101 may include at least one processor (120, 212, 214, 260). The at least one processor (120, 212, 214, 260) may be configured to identify the execution of at least one first application. The at least one processor (120, 212, 214, 260) may be configured to identify at least one first IE of a UE assistance information (UAI) message stored corresponding to the at least one first application and/or information related to the location of the electronic device 101. The at least one processor (120, 212, 214, 260) may be configured to transmit a UAI message including the at least one first IE to a network.

According to an embodiment of the disclosure, the at least one processor (120, 212, 214, 260) may be configured to, as at least part of an operation of identifying at least one first IE stored corresponding to the at least one first application and/or information related to the location of the electronic device 101, identify the at least one first IE stored corresponding to the identification information of each of the at least one first application.

According to an embodiment of the disclosure, the at least one processor (120, 212, 214, 260) may be configured to, as at least part of an operation of identifying at least one first IE stored corresponding to the at least one first application and/or information related to the location of the electronic device 101, identify the at least one first IE stored corresponding to the type, real-time, and/or periodicity of data transmission and reception of each of the at least one first application.

According to an embodiment of the disclosure, the at least one processor (120, 212, 214, 260) may be configured to, as at least part of an operation of identifying at least one first IE stored corresponding to the at least one first application and/or information related to the location of the electronic device 101, identify at least one piece of information related to the location of the electronic device 101. The at least one processor (120, 212, 214, 260) may be configured to, as at least part of an operation of identifying the at least one first IE stored corresponding to the at least one first application, identify the at least one first IE stored corresponding to the at least one first application and at least one piece of information related to the location of the electronic device 101.

According to an embodiment of the disclosure, the at least one processor (120, 212, 214, 260) may be configured to, as at least part of an operation of identifying at least one piece of information related to the location of the electronic device 101, identify identification information of a serving cell to which the electronic device 101 is connected, information on the electric field of the serving cell, identification information of at least one neighbor cell, information on the electric field of each of the at least one neighbor cell, identification information of the external Wi-Fi AP, and/or the GPS information of the electronic device 101 as at least one piece of information related to the location.

According to an embodiment of the disclosure, the at least one processor (120, 212, 214, 260) may be configured to, as at least part of an operation of transmitting the UAI message including the at least one first IE to a network, transmit the UAI message including the at least one first IE based on that the similarity between the at least one parameter identified at the current time and the at least one parameter stored corresponding to the at least one first IE is greater than or equal to the threshold similarity.

According to an embodiment of the disclosure, the at least one processor (120, 212, 214, 260) may be configured to, as at least part of an operation of identifying at least one first IE stored corresponding to the at least one first application and/or information related to the location of the electronic device 101, identify an IE set stored corresponding to the at least one first application among the plurality of applications as the at least one first IE by referring to related information between the plurality of applications and the plurality of IE sets stored in the electronic device 101.

According to an embodiment of the disclosure, the at least one processor (120, 212, 214, 260) may be configured to identify at least one parameter set multiple times while the at least one first application is executed. The at least one processor (120, 212, 214, 260) may be configured to generate sub-related information between the at least one first application of the related information and the at least one first IE, based on the at least one parameter set identified multiple times.

According to an embodiment of the disclosure, the at least one processor (120, 212, 214, 260) may be configured to, as at least part of an operation of generating sub-related information between the at least one first application of the related information and the at least one first IE, based on the at least one parameter set identified multiple times, identify the ratio between the numbers of MIMO layers allocated to the electronic device 101 while the at least one first application is executed, based on the at least one parameter set identified multiple times. The at least one processor (120, 212, 214, 260) may be configured to, as at least part of an operation of generating sub-related information between the at least one first application of the related information and the at least one first IE, based on the at least one parameter set identified multiple times, identify the maximum number of IEs of the MIMO layer as at least a part of the at least one first IE, based on the identified ratio.

According to an embodiment of the disclosure, the at least one processor (120, 212, 214, 260) may be configured to, as at least part of an operation of generating sub-related information between the at least one first application of the related information and the at least one first IE, based on the at least one parameter set identified multiple times, identify the data transmission/reception ratio of each activated at least one carrier component (CC) allocated to the electronic device 101 while the at least one first application is executed, based on the at least one parameter set identified multiple times. The at least one processor (120, 212, 214, 260) may be configured to, as at least part of an operation of generating sub-related information between the at least one first application of the related information and the at least one first IE, based on the at least one parameter set identified multiple times, identify the IE of the maximum number of secondary CCs as at least a part of the at least one first IE, based on the data transmission/reception rate.

According to an embodiment of the disclosure, the at least one processor (120, 212, 214, 260) may be configured to, as at least part of an operation of generating sub-related information between the at least one first application of the related information and the at least one first IE, based on the at least one parameter set identified multiple times, identify information on a resource block (RB) and/or bandwidth allocated to the electronic device 101 while the at least one first application is executed, based on the at least one parameter set identified multiple times. The at least one processor (120, 212, 214, 260) may be configured to, as at least part of an operation of generating sub-related information between the at least one first application of the related information and the at least one first IE, based on the at least one parameter set identified multiple times, identify the IE of the maximum value of the aggregated bandwidth as at least a part of the at least one first IE, based on the information on the RB and/or bandwidth.

According to an embodiment of the disclosure, the at least one processor (120, 212, 214, 260) may be configured to, as at least part of an operation of generating sub-related information between the at least one first application of the related information and the at least one first IE, based on the at least one parameter set identified multiple times, identify a congestion level of a cell to which the electronic device 101 is connected, based on the at least one parameter set identified multiple times. The at least one processor (120, 212, 214, 260) may be configured to, as at least part of an operation of generating sub-related information between the at least one first application of the related information and the at least one first IE, based on the at least one parameter set identified multiple times, generate sub-related information between the at least one first application of the related information and the at least one first IE, based on the congestion level.

According to an embodiment of the disclosure, the at least one processor (120, 212, 214, 260) may be configured to, as at least part of an operation of identifying a congestion level of a cell, identify the congestion level based on the number of symbols of the PDCCH. The at least one processor (120, 212, 214, 260) may be configured to, as at least part of an operation of identifying a congestion level of a cell, identify the congestion level, based on the total number of slots of the PDSCH and the number of slots including PDSCH symbols having RSSI greater than or equal to the threshold RSSI.

According to an embodiment of the disclosure, a method of operating the electronic device 101 may include identifying the execution of at least one first application, identifying at least one first IE of a UE assistance information (UAI) message stored corresponding to the at least one first application and/or information related to the location of the electronic device 101, and transmitting a UAI message including the at least one first IE to a network.

According to an embodiment of the disclosure, the identifying of the at least one first IE stored corresponding to the at least one first application and/or the at least one piece of information related to the location of the electronic device 101 may include identifying the at least one first IE stored corresponding to the identification information of each of the at least one first application.

According to an embodiment of the disclosure, the identifying of the at least one first IE stored corresponding to the at least one first application and/or information related to the location of the electronic device 101 may include identifying the at least one first IE stored corresponding to the type, real-time, and/or periodicity of data transmission and reception of each of the at least one first application.

According to an embodiment of the disclosure, the identifying of the at least one first IE stored corresponding to the at least one first application and/or information related to the location of the electronic device 101 may include identifying at least one piece of information related to the location of the electronic device 101. The identifying of the at least one first IE stored corresponding to the at least one first application may include identifying the at least one first IE stored corresponding to the at least one first application and at least one piece of information related to the location of the electronic device 101.

According to an embodiment of the disclosure, the identifying of the at least one piece of information related to the location of the electronic device 101 may include identifying identification information of a serving cell to which the electronic device 101 is connected, information on the electric field of the serving cell, identification information of at least one neighbor cell, information on the electric field of each of the at least one neighbor cell, identification information of the external Wi-Fi AP, and/or the GPS information of the electronic device 101 as at least one piece of information related to the location.

According to an embodiment of the disclosure, as an operation of transmitting the UAI message including the at least one first IE to a network, the at least one processor (120, 212, 214, 260) may transmit the UAI message including the at least one first IE based on that the similarity between the at least one parameter identified at the current time and the at least one parameter stored corresponding to the at least one first IE is greater than or equal to the threshold similarity.

According to an embodiment of the disclosure, as an operation of identifying at least one first IE stored corresponding to the at least one first application and/or the at least one piece of information related to the location of the electronic device 101, the at least one processor (120, 212, 214, 260) may identify an IE set stored corresponding to the at least one first application among the plurality of applications as the at least one first IE by referring to related information between the plurality of applications and the plurality of IE sets stored in the electronic device 101.

According to an embodiment of the disclosure, the method of operating the electronic device 101 may include identifying at least one parameter set multiple times while the at least one first application is executed. The method of the electronic device 101 may include generating sub-related information between the at least one first application of the related information and the at least one first IE, based on the at least one parameter set identified multiple times.

According to an embodiment of the disclosure, as an operation of generating sub-related information between the at least one first application of the related information and the at least one first IE, based on the at least one parameter set identified multiple times, the at least one processor (120, 212, 214, 260) may include identifying the ratio between the numbers of MIMO layers allocated to the electronic device 101 while the at least one first application is executed, based on the at least one parameter set identified multiple times. As an operation of generating sub-related information between the at least one first application of the related information and the at least one first IE, based on the at least one parameter set identified multiple times, the at least one processor (120, 212, 214, 260) may include identifying the maximum number of IEs of the MIMO layer as at least a part of the at least one first IE, based on the identified ratio.

According to an embodiment of the disclosure, as an operation of generating sub-related information between the at least one first application of the related information and the at least one first IE, based on the at least one parameter set identified multiple times, the at least one processor (120, 212, 214, 260) may include identifying the data transmission/reception ratio of each activated at least one carrier component (CC) allocated to the electronic device 101 while the at least one first application is executed, based on the at least one parameter set identified multiple times. As an operation of generating sub-related information between the at least one first application of the related information and the at least one first IE, based on the at least one parameter set identified multiple times, the at least one processor (120, 212, 214, 260) may include identifying the IE of the maximum number of secondary CCs as at least a part of the at least one first IE, based on the data transmission/reception rate.

According to an embodiment of the disclosure, as an operation of generating sub-related information between the at least one first application of the related information and the at least one first IE, based on the at least one parameter set identified multiple times, the at least one processor (120, 212, 214, 260) may include identifying information on a resource block (RB) and/or bandwidth allocated to the electronic device 101 while the at least one first application is executed, based on the at least one parameter set identified multiple times.

The operation of generating sub-related information between the at least one first application of the related information and the at least one first IE, based on the at least one parameter set identified multiple times may identify the IE of the maximum value of the aggregated bandwidth as at least a part of the at least one first IE, based on the information on the RB and/or bandwidth.

According to an embodiment of the disclosure, the generating of the sub-related information between the at least one first application of the related information and the at least one first IE, based on the at least one parameter set identified multiple times may include identifying a congestion level of a cell to which the electronic device 101 is connected, based on the at least one parameter set identified multiple times. The operation of generating sub-related information between the at least one first application of the related information and the at least one first IE, based on the at least one parameter set identified multiple times may include generating sub-related information between the at least one first application of the related information and the at least one first IE, based on the congestion level.

According to an embodiment of the disclosure, the identifying of the congestion level of a cell may include identifying the congestion level based on the number of symbols of the PDCCH. The operation of identifying a congestion level of a cell may include identifying the congestion level, based on the total number of slots of the PDSCH and the number of slots including PDSCH symbols having RSSI greater than or equal to the threshold RSSI.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

at least one processor; and memory storing instructions that, when executed by the at least one processor, cause the electronic device to:

identify a location of the electronic device, identify at least one first information element (IE) of a user equipment (UE) assistance information (UAI) message stored corresponding to at least one piece of information related to the location of the electronic device, and transmit a UAI message including the at least one first IE to a network, wherein the instructions, when executed by the at least one processor, cause the electronic device to, as at least part of transmitting the UAI message including the at least one first IE to the network:

transmit the UAI message including the at least one first IE based on that a similarity between at least one parameter identified at a current time and at least one parameter stored corresponding to the at least one first IE is greater than or equal to a threshold similarity.

2. The electronic device of claim 1, wherein the instructions, when executed by the at least one processor, cause the electronic device to, as at least part of transmitting the UAI message including the at least one first IE:

based on the electronic device accessing a first cell, transmit the UAI message including the at least one first IE indicating two of a maximum number of MIMO layers.

3. The electronic device of claim 1, wherein the instructions, when executed by the at least one processor cause the electronic device to:

identify an execution of at least one first application, and identify at least one first IE stored corresponding to the at least one first application and/or the at least one piece of information related to the location of the electronic device.

4. The electronic device of claim 3, wherein the instructions, when executed by the at least one processor, cause the electronic device to, as at least part of an operation of identifying at least one first IE stored corresponding to the at least one first application and/or the at least one piece of information related to the location of the electronic device:

identify the at least one first IE stored corresponding to identification information of each of the at least one first application.

5. The electronic device of claim 1, wherein the instructions, when executed by the at least one processor, cause the electronic device to, as at least part of identifying at least one piece of information related to the location of the electronic device:

identify identification information of a serving cell to which the electronic device is connected, information on an electric field of the serving cell, identification information of at least one neighbor cell, information on the electric field of each of the at least one neighbor cell, identification information of an external wireless fidelity (Wi-Fi) access point (AP), and/or a global positioning system (GPS) information of the electronic device as at least one piece of information related to the location.

6. The electronic device of claim 3, wherein the instructions, when executed by the at least one processor, cause the electronic device to, as at least part of identifying at least one first IE stored corresponding to the at least one first application and/or the at least one piece of information related to the location of the electronic device:

identify an IE set stored corresponding to the at least one first application among a plurality of applications as the at least one first IE by referring to related information between the plurality of applications and a plurality of IE sets stored in the electronic device.

7. The electronic device of claim 6, wherein the instructions, when executed by the at least one processor, cause the electronic device to:

identify at least one parameter set multiple times while the at least one first application is executed, and generate sub-related information between the at least one first application and the at least one first IE of the related information, based on at least one parameter set identified multiple times.

8. The electronic device of claim 7, wherein the instructions, when executed by the at least one processor, cause the electronic device to, as at least part of generating sub-related information between the at least one first application and the at least one first IE of the related information, based on the at least one parameter set identified multiple times:

identify a ratio between a numbers of multiple input multiple output (MIMO) layers allocated to the electronic device while the at least one first application is executed, based on the at least one parameter set identified multiple times, and identify a maximum number of IEs of the MIMO layer as at least a part of the at least one first IE, based on the identified ratio.

9. The electronic device of claim 7, wherein the instructions, when executed by the at least one processor, cause the electronic device to, as at least part of generating sub-related information between the at least one first application and the at least one first IE of the related information, based on the at least one parameter set identified multiple times:

identify a data transmission/reception ratio of each activated at least one carrier component (CC) allocated to the electronic device while the at least one first application is executed, based on the at least one parameter set identified multiple times, and identify the IE of a maximum number of secondary CCs as at least a part of the at least one first IE, based on the data transmission/reception ratio.

10. The electronic device of claim 7, wherein the instructions, when executed by the at least one processor, cause the electronic device to, as at least part of generating sub-related information between the at least one first application and the at least one first IE of the related information, based on the at least one parameter set identified multiple times:

identify information on a resource block (RB) and/or bandwidth allocated to the electronic device while the at least one first application is executed, based on the at least one parameter set identified multiple times, and identify the IE of a maximum value of an aggregated bandwidth as at least a part of the at least one first IE, based on the information on the RB and/or bandwidth.

11. The electronic device of claim 7, wherein the instructions, when executed by the at least one processor, cause the electronic device to, as at least part of generating sub-related information between the at least one first application and the at least one first IE of the related information, based on the at least one parameter set identified multiple times:

identify a congestion level of a cell to which the electronic device is connected, based on the at least one parameter set identified multiple times, and generate sub-related information between the at least one first application and the at least one first IE of the related information, based on the congestion level.

12. The electronic device of claim 11, wherein the instructions, when executed by the at least one processor, cause the electronic device to, as at least part of identifying a congestion level of a cell:

identify the congestion level based on a number of symbols of a physical downlink control channel (PDCCH), and/or identify the congestion level, based on a total number of slots of a physical downlink shared channel (PDSCH) and a number of slots including PDSCH symbols having RSSI greater than or equal to a threshold RSSI.

13. A method of operating an electronic device, the method comprising:

identifying a location of the electronic device;

identifying at least one first information element (IE) of a user equipment (UE) assistance information (UAI) message stored corresponding to at least one piece of information related to a location of the electronic device; and transmitting a UAI message including the at least one first IE to a network, wherein the transmitting of the UAI message includes:

transmitting the UAI message including the at least one first IE based on that a similarity between at least one parameter identified at a current time and at least one parameter stored corresponding to the at least one first IE is greater than or equal to a threshold similarity.

14. The method of claim 13, wherein the transmitting the UAI message including the at least one first IE comprises:

based on the electronic device accessing a first cell, transmitting the UAI message including the at least one first IE indicating two of a maximum number of MIMO layers.

15. The method of claim 13, further comprising:

identifying an execution of at least one first application; and identifying the at least one first IE stored corresponding to the at least one first application and/or the at least one piece of information related to the location of the electronic device.

16. The method of claim 15, wherein the identifying the at least one first IE stored corresponding to the at least one first application and/or the at least one piece of information related to the location of the electronic device comprises:

identifying an IE set stored corresponding to the at least one first application among a plurality of applications as the at least one first IE by referring to related information between the plurality of applications and a plurality of IE sets stored in the electronic device.

17. One or more non-transitory computer-readable storage media storing computer-executable instructions, that when executed by at least one processor of an electronic device, configure the electronic device to perform operations comprising:

identifying a location of the electronic device;

identifying at least one first IE of a user equipment (UE) assistance information (UAI) message stored corresponding to information related to a location of the electronic device; and transmitting a UAI message including the at least one first IE to a network, wherein the transmitting of the UAI message includes:

transmitting the UAI message including the at least one first IE based on that a similarity between at least one parameter identified at a current time and at least one parameter stored corresponding to the at least one first IE is greater than or equal to a threshold similarity.

18. The one or more non-transitory computer-readable storage media of claim 17, wherein the transmitting the UAI message including the at least one first IE comprises:

based on the electronic device accessing a first cell, transmitting the UAI message including the at least one first IE indicating two of a maximum number of MIMO layers.

* * * * *